United States Patent
Liu et al.

(10) Patent No.: US 12,200,779 B2
(45) Date of Patent: Jan. 14, 2025

(54) SIGNALING EXCHANGE REDUCTION DESIGNS FOR MULTI-ENCODER SELECTION

(71) Applicant: QUALCOMM Incorporated, San Diego, CA (US)

(72) Inventors: Guangyi Liu, San Diego, CA (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/678,933

(22) Filed: Feb. 23, 2022

(65) Prior Publication Data

US 2023/0269787 A1    Aug. 24, 2023

(51) Int. Cl.
*H04W 72/0446* (2023.01)
*H04W 74/00* (2009.01)
*H04W 74/08* (2009.01)
*H04W 74/0833* (2024.01)

(52) U.S. Cl.
CPC ..... *H04W 74/085* (2013.01); *H04W 72/0446* (2013.01); *H04W 74/002* (2013.01); *H04W 74/0866* (2013.01)

(58) Field of Classification Search
CPC ..... H04W 72/04; H04W 74/08; H04W 74/00; H04W 72/0446; H04W 88/08; H03M 13/00; H03M 13/05; H03M 7/34; H03M 1/78; H03M 5/14; H03M 13/53; H03M 3/00; H03M 5/00; H03M 1/76; H03M 13/01; H03M 1/18; H03M 1/00; H03M 7/30; H03M 7/00; H03M 1/06; H03M 13/07; H03M 1/62; H04L 9/14; H04L 5/22; H04L 12/50; H04L 69/24; H04L 43/0894; H04L 25/52; H04L 67/50
See application file for complete search history.

(56) References Cited

U.S. PATENT DOCUMENTS

2022/0132553 A1*  4/2022  Wang ................... H04B 7/0632

* cited by examiner

*Primary Examiner* — Tu X Nguyen
(74) *Attorney, Agent, or Firm* — Holland & Hart LLP

(57) ABSTRACT

Methods, systems, and devices for wireless communications are described. A user equipment (UE) and multiple network coding devices may communicate to reduce multiple network coding devices accepting a same take over request message from the UE for a given data packet. In some examples, the multiple network coding devices may determine respective backoff periods to wait before accepting the take over request message such that each backoff period is different for each network coding device. In some examples, the UE may receive respective broadcast messages from each of the multiple network coding devices that indicate a network coding capability parameter, and the UE may select a network coding device based on the received capability parameter. In some examples, a network coding device may transmit an indication of packet overload and refrain from accepting a take over request message.

28 Claims, 15 Drawing Sheets

SIGNALING EXCHANGE REDUCTION DESIGNS FOR MULTI-ENCODER SELECTION

FIELD OF TECHNOLOGY

The following relates to wireless communications, including signaling exchange reduction designs for multi-encoder selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support signaling exchange reduction designs for multi-encoder selection. Generally, the described network coding techniques to reduce multiple network coding devices from taking over encoding of a same packet or transport block. In some examples, a first network coding device may send an accept-request message to a first user equipment (UE) with respect to a given packet to accept encoding (e.g., network encoding) of the given packet. In such examples, each network coding device associated with the first UE may define respective backoff periods such that each of the network coding devices may delay n-slots before sending an accept-request message to the first UE.

Additionally or alternatively, the first UE may select a network coding device for take over based on determining a capability associated with each of the network coding devices associated with the first UE. For example, the first UE may periodically receive broadcast messages from each network coding device that may include parameters associated with the respective network coding device. Based on receiving the periodic broadcast messages from each network coding device, the UE may choose a network coding device with a given capability or a network coding device with a capability above a threshold.

Additionally or alternatively, each network coding device may monitor feedback-collection packets and network coding packets sent by other network coding devices including acknowledgement (ACK) or non-ACK (NACK) feedback messages transmitted to other network coding devices by one or more UEs. If during monitoring, a first network coding device determines that a second network coding device has taken over one or more packets, the first network coding device may give up the respective packets and not perform network encoding of the one or more packets. In some examples, a network coding device may signal to other network coding devices that the network coding device has accepted or taken over one or more packets (e.g., for a given time period), such that other network coding devices may give up or refrain from performing network encoding of packets (e.g., packet received at the one or more other network coding devices or requested by a UE during the given time period).

A method for wireless communications at a network coding device is described. The method may include receiving, from a UE, a message including both a transport block and a request to perform network encoding of the transport block for transmission to a second UE, transmitting, to the UE in a transmission time interval (TTI) corresponding to a backoff period for network coding requests associated with the network coding device, an acceptance message in response to the message, where the acceptance message indicates that the network coding device accepts the request to perform the network encoding of the transport block, performing network encoding of the transport block for transmission to the second UE after transmitting the acceptance message, and transmitting, to the second UE, the network encoded transport block.

An apparatus for wireless communications at a network coding device is described. The apparatus may include a processor, memory coupled with the processor, and instructions stored in the memory. The instructions may be executable by the processor to cause the apparatus to receive, from a UE, a message including both a transport block and a request to perform network encoding of the transport block for transmission to a second UE, transmit, to the UE in a TTI corresponding to a backoff period for network coding requests associated with the network coding device, an acceptance message in response to the message, where the acceptance message indicates that the network coding device accepts the request to perform the network encoding of the transport block, perform network encoding of the transport block for transmission to the second UE after transmitting the acceptance message, and transmit, to the second UE, the network encoded transport block.

Another apparatus for wireless communications at a network coding device is described. The apparatus may include means for receiving, from a UE, a message including both a transport block and a request to perform network encoding of the transport block for transmission to a second UE, means for transmitting, to the UE in a TTI corresponding to a backoff period for network coding requests associated with the network coding device, an acceptance message in response to the message, where the acceptance message indicates that the network coding device accepts the request to perform the network encoding of the transport block, means for performing network encoding of the transport block for transmission to the second UE after transmitting the acceptance message, and means for transmitting, to the second UE, the network encoded transport block.

A non-transitory computer-readable medium storing code for wireless communications at a network coding device is described. The code may include instructions executable by a processor to receive, from a UE, a message including both a transport block and a request to perform network encoding of the transport block for transmission to a second UE, transmit, to the UE in a TTI corresponding to a backoff period for network coding requests associated with the network coding device, an acceptance message in response to the message, where the acceptance message indicates that the network coding device accepts the request to perform the network encoding of the transport block, perform network encoding of the transport block for transmission to the second UE after transmitting the acceptance message, and transmit, to the second UE, the network encoded transport block.

Some examples of the method, apparatuses, and non-transitory computer-readable medium described herein may further include operations, features, means, or instructions for receiving, from one or more other network coding devices, one or more indications of respective backoff periods for each of the one or more other network coding devices and selecting the backoff period from a set of backoff periods, where the backoff period may be different from the respective backoff periods.

In some examples of the method, apparatuses, and non-transitory computer-readable medium described herein, selecting the backoff period may include operations, features, means, or instructions for randomly selecting the backoff period from the set of backoff periods.

Some examples of the method, apparatuses, and non-transitory computer-readable medium described herein may further include operations, features, means, or instructions for receiving, from a second network coding device, an indication of a maximum backoff period for the set of backoff periods.

In some examples of the method, apparatuses, and non-transitory computer-readable medium described herein, the set of backoff periods may be based on a packet delay budget associated with the transport block.

In some examples of the method, apparatuses, and non-transitory computer-readable medium described herein, a maximum backoff period of the set of backoff periods may be preconfigured at the network coding device.

Some examples of the method, apparatuses, and non-transitory computer-readable medium described herein may further include operations, features, means, or instructions for transmitting an indication of the backoff period to one or more other network coding devices.

Some examples of the method, apparatuses, and non-transitory computer-readable medium described herein may further include operations, features, means, or instructions for receiving, from a second network coding device, an indication of an overload at the second network coding device, where the acceptance message may be transmitted based on the indication of the overload at the second network coding device.

In some examples of the method, apparatuses, and non-transitory computer-readable medium described herein, the indication of the overload may include operations, features, means, or instructions for at least one bit indicating: a presence or absence of the overload at the second network coding device, a first time slot associated with a start time for pausing network encoding at the second network coding device, a second time slot indicating resumption of network encoding at the second network coding device, or a combination thereof.

In some examples of the method, apparatuses, and non-transitory computer-readable medium described herein, the indication of the second time slot indicates a current time slot indicating network coding resumption by the second network coding device for the current time slot.

Some examples of the method, apparatuses, and non-transitory computer-readable medium described herein may further include operations, features, means, or instructions for receiving one or more messages from one or more wireless devices, the one or more messages associated with network encoding of one or more other transport blocks.

Some examples of the method, apparatuses, and non-transitory computer-readable medium described herein may further include operations, features, means, or instructions for refraining from performing the network encoding of the one or more other transport blocks based on receiving the one or more messages, where the one or more messages includes one or more network coded packets, or one or more feedback messages, or a combination thereof.

Some examples of the method, apparatuses, and non-transitory computer-readable medium described herein may further include operations, features, means, or instructions for transmitting, to one or more other network coding devices, a take over message indicating that the network coding device may be to perform network coding for the one or more other transport blocks.

In some examples of the method, apparatuses, and non-transitory computer-readable medium described herein, the take over message may include operations, features, means, or instructions for a packet identifier of the one or more other transport blocks and a source identifier of the one or more wireless devices.

A method for wireless communications at a UE is described. The method may include receiving a respective broadcast message from each of a set of network coding devices, where the respective messages indicate a network coding capability for the respective network coding device of the set of network coding devices, selecting a network coding device from the set of network coding devices based on the network coding capability of the network coding device, and transmitting, to the selected network coding device, a message including both a transport block and a request to perform network encoding of the transport block for transmission to a second UE.

An apparatus for wireless communications at a UE is described. The apparatus may include a processor, memory coupled with the processor, and instructions stored in the memory. The instructions may be executable by the processor to cause the apparatus to receive a respective broadcast message from each of a set of network coding devices, where the respective messages indicate a network coding capability for the respective network coding device of the set of network coding devices, select a network coding device from the set of network coding devices based on the network coding capability of the network coding device, and transmit, to the selected network coding device, a message including both a transport block and a request to perform network encoding of the transport block for transmission to a second UE.

Another apparatus for wireless communications at a UE is described. The apparatus may include means for receiving a respective broadcast message from each of a set of network coding devices, where the respective messages indicate a network coding capability for the respective network coding device of the set of network coding devices, means for selecting a network coding device from the set of network coding devices based on the network coding capability of the network coding device, and means for transmitting, to the selected network coding device, a message including both a transport block and a request to perform network encoding of the transport block for transmission to a second UE.

A non-transitory computer-readable medium storing code for wireless communications at a UE is described. The code may include instructions executable by a processor to receive a respective broadcast message from each of a set of network coding devices, where the respective messages indicate a network coding capability for the respective network coding device of the set of network coding devices, select a network coding device from the set of network coding devices based on the network coding capability of the network coding device, and transmit, to the selected network coding device, a message including both a transport block and a request to perform network encoding of the transport block for transmission to a second UE.

Some examples of the method, apparatuses, and non-transitory computer-readable medium described herein may further include operations, features, means, or instructions for transmitting an identifier associated with the selected network coding device in a sidelink control information message.

Some examples of the method, apparatuses, and non-transitory computer-readable medium described herein may further include operations, features, means, or instructions for transmitting signaling requesting the selected network coding device to perform network coding for the UE for a period of time, where the signaling includes an identifier associated with the selected network coding device, a start slot time, an end slot time, or a combination thereof.

In some examples of the method, apparatuses, and non-transitory computer-readable medium described herein, the network coding capability may include operations, features, means, or instructions for a global navigation satellite system (GNSS) location associated with a respective network coding device, one or more parameters indicating that the respective network coding device may be capable of network encoding, or a combination thereof.

Some examples of the method, apparatuses, and non-transitory computer-readable medium described herein may further include operations, features, means, or instructions for selecting the network coding device based on one or more parameters associated with the network coding device, where the one or more parameters include a reference signal received power (RSRP) associated with the network coding device, a signal quality associated with the network coding device, a distance of the network coding device relative to the UE, or a combination thereof.

Some examples of the method, apparatuses, and non-transitory computer-readable medium described herein may further include operations, features, means, or instructions for selecting the network coding device based on the network coding device with the RSRP above a threshold.

Some examples of the method, apparatuses, and non-transitory computer-readable medium described herein may further include operations, features, means, or instructions for receiving an indication of the threshold from a second network coding device.

Some examples of the method, apparatuses, and non-transitory computer-readable medium described herein may further include operations, features, means, or instructions for receiving an acceptance message from the network coding device in response to the message, where the acceptance message indicates that the network coding device accepts the request to perform the network encoding of the transport block.

Some examples of the method, apparatuses, and non-transitory computer-readable medium described herein may further include operations, features, means, or instructions for receiving, from a second network coding device, an indication of an overload at the second network coding device and refraining from selecting the second network coding device from the set of network coding devices based on the indication of the overload.

In some examples of the method, apparatuses, and non-transitory computer-readable medium described herein, the indication of the overload may include operations, features, means, or instructions for at least one bit indicating: a presence or absence of the overload at the second network coding device, a first time slot indicating a start time for pausing network coding at the second network coding device, a second time slot indicating resumption of network coding at the second network coding device, or a combination thereof.

In some examples of the method, apparatuses, and non-transitory computer-readable medium described herein, the indication of the second time slot indicates a current time slot indicating network coding resumption by the second network coding device for the current time slot.

A method for wireless communications at a network coding device is described. The method may include transmitting a broadcast message indicating a network coding capability for the network coding device, receiving, from a UE, a message including a transport block, a request to perform network encoding of the transport block for transmission to a second UE, and an identifier associated with the network coding device, transmitting, to the UE, an acceptance message in response to the message, where the acceptance message indicates that the network coding device accepts the request to perform the network encoding of the transport block, and transmitting, to the second UE, the network encoded transport block.

An apparatus for wireless communications at a network coding device is described. The apparatus may include a processor, memory coupled with the processor, and instructions stored in the memory. The instructions may be executable by the processor to cause the apparatus to transmit a broadcast message indicating a network coding capability for the network coding device, receive, from a UE, a message including a transport block, a request to perform network encoding of the transport block for transmission to a second UE, and an identifier associated with the network coding device, transmit, to the UE, an acceptance message in response to the message, where the acceptance message indicates that the network coding device accepts the request to perform the network encoding of the transport block, and transmit, to the second UE, the network encoded transport block.

Another apparatus for wireless communications at a network coding device is described. The apparatus may include means for transmitting a broadcast message indicating a network coding capability for the network coding device, means for receiving, from a UE, a message including a transport block, a request to perform network encoding of the transport block for transmission to a second UE, and an identifier associated with the network coding device, means for transmitting, to the UE, an acceptance message in response to the message, where the acceptance message indicates that the network coding device accepts the request to perform the network encoding of the transport block, and means for transmitting, to the second UE, the network encoded transport block.

A non-transitory computer-readable medium storing code for wireless communications at a network coding device is described. The code may include instructions executable by a processor to transmit a broadcast message indicating a network coding capability for the network coding device, receive, from a UE, a message including a transport block, a request to perform network encoding of the transport block for transmission to a second UE, and an identifier associated with the network coding device, transmit, to the UE, an acceptance message in response to the message, where the acceptance message indicates that the network coding device accepts the request to perform the network encoding of the transport block, and transmit, to the second UE, the network encoded transport block.

Some examples of the method, apparatuses, and non-transitory computer-readable medium described herein may further include operations, features, means, or instructions for receiving, from the UE, signaling requesting the network coding device to perform network coding for the UE for a period of time, where the signaling includes an identifier associated with the network coding device, a start slot time, an end slot time, or a combination thereof.

Some examples of the method, apparatuses, and non-transitory computer-readable medium described herein may further include operations, features, means, or instructions for receiving, from a second network coding device, an indication of an overload at the second network coding device, where the acceptance message may be transmitted based on the indication of the overload at the second network coding device and transmitting, to the UE, the acceptance message based on receiving the indication of the overload at the second network coding device.

Some examples of the method, apparatuses, and non-transitory computer-readable medium described herein may further include operations, features, means, or instructions for receiving one or more messages from one or more wireless devices, the one or more messages associated with network encoding of one or more other transport blocks.

Some examples of the method, apparatuses, and non-transitory computer-readable medium described herein may further include operations, features, means, or instructions for refraining from performing the network encoding of the one or more other transport blocks based on receiving the one or more messages, where the one or more messages includes one or more network coded packets, or one or more feedback messages, or a combination thereof.

Some examples of the method, apparatuses, and non-transitory computer-readable medium described herein may further include operations, features, means, or instructions for transmitting, to one or more other network coding devices, a take over message indicating that the network encoding device may be to perform network coding for the one or more other transport blocks.

In some examples of the method, apparatuses, and non-transitory computer-readable medium described herein, the take over message may include operations, features, means, or instructions for a packet identifier of the one or more other transport blocks and a source identifier of the one or more wireless devices.

DETAILED DESCRIPTION

Figure 1:
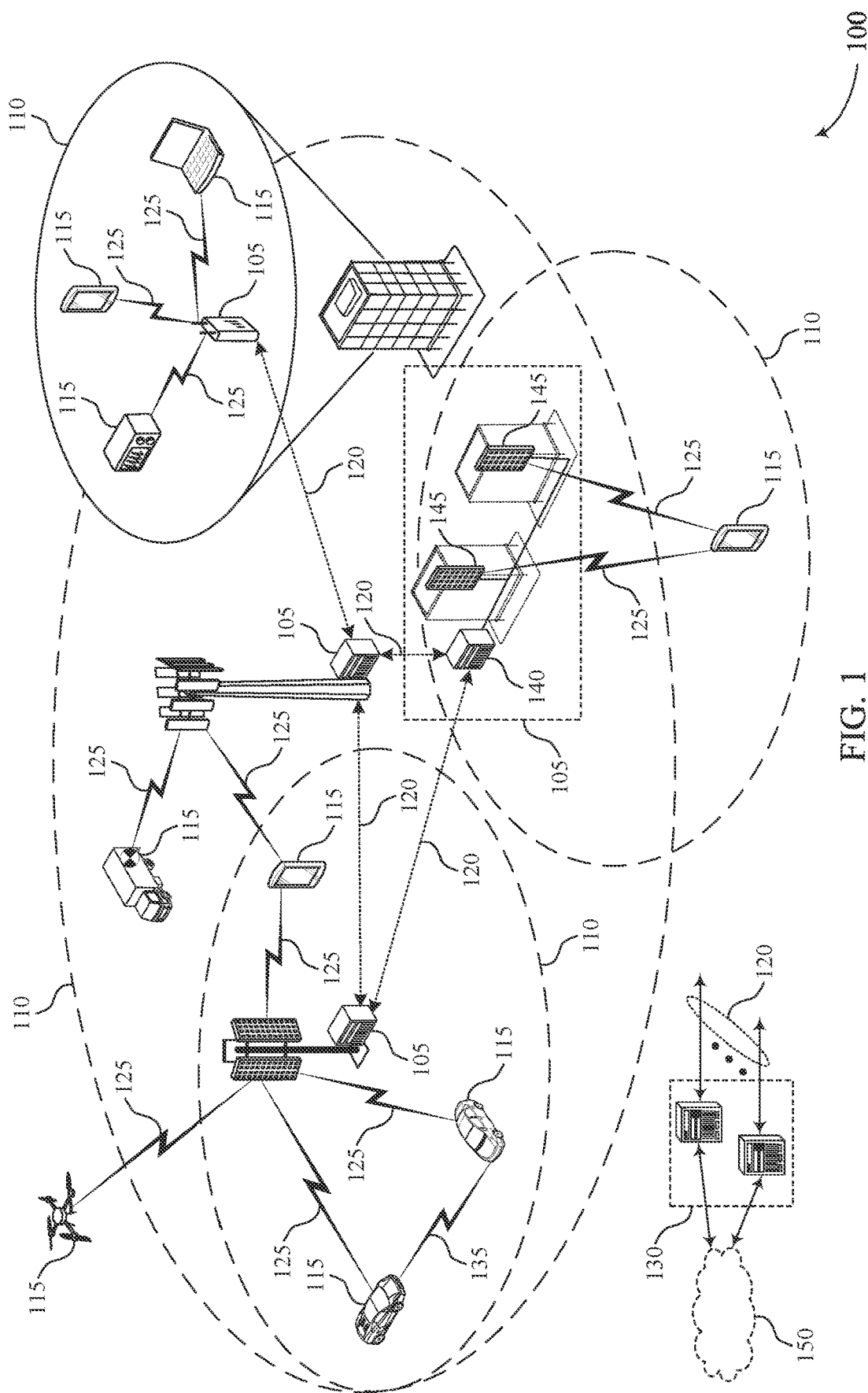
FIG. 1 illustrates an example of a wireless communications system that supports signaling exchange reduction designs for multi-encoder selection in accordance with aspects of the present disclosure.

In some examples of wireless communications, one or more wireless devices may support network coding. For example, a first user equipment (UE) may transmit a transport block and a coding request flag to a network coding device, requesting the network coding device transmit the transport block to another wireless device (e.g., a second UE) for (e.g., on behalf of) the first UE. If the network coding device accepts the request, the network coding device may transmit an acceptance message to the first UE indicating that the network coding device is to take over encoding of the transport block and relaying the transport block to the wireless device indicated by the first UE. In some cases, however, the first UE may be within geographic range of multiple network coding devices at a given time. If multiple network coding devices accept the coding request from the first UE, the second UE may receive duplicate network coding devices, which may increase signaling overhead and resource usage at each respective network coding device.

The wireless communications system may reduce the number of multiple network coding devices accepting a same take over request from the first UE by operating in accordance with the techniques described herein. In some examples, a first network coding device may transmit an accept-request message to the first UE (e.g., in response to a request from the UE) with respect to a given packet indicating that the first network coding device is to take over network encoding of the given packet. In such examples, each network coding device associated with the first UE may be associated with a respective backoff period (e.g., n-slots) such that each of the network coding devices may delay respective numbers of n-slots before sending an accept-request message to the first UE. In some cases, each network coding device may signal to each other an indication of their respective backoff period such that each network coding device may use a different backoff period. In some examples, a network coding device may signal to other network coding devices as well as the first UE, that it is overloaded in taking over packets and is pausing network encoding (e.g., for a period of time), and as such another network coding device may accept the network coding request.

Additionally or alternatively, the first UE may select a network coding device for take over based on determining a capability associated with one or more network coding devices associated with the first UE. For example, the first UE may periodically receive broadcast messages from one or more network coding device that may include parameters associated with a respective network coding device (e.g., global navigation satellite system (GNSS) location, parameters indicating network coding device identification, etc.). Based on receiving the periodic broadcast messages from each network coding device, the UE may choose a network coding device with a defined capability (e.g., highest reference signal received power (RSRP), shortest distance, etc.) or a network coding device with a capability above a defined threshold. In some examples, a network coding device may signal to other network coding devices as well as the first UE, that it is overloaded and may be unable to perform network encoding for one or more packets (e.g., one or more packets received or requested during a time interval) and is pausing network encoding. As such, the UE may refrain from selecting the overloaded network coding device.

Additionally or alternatively, each network coding device may also monitor feedback-collection packets and network coding packets sent by other network coding devices as well as acknowledgement (ACK) or non-ACK (NACK) feedback messages transmitted to other network coding devices by one or more UEs. If during monitoring, a first network coding device determines that a second network coding device has taken over network encoding of one or more packets, the first network coding device may give up network encoding responsibilities of the respective packets. In some examples, a network coding device may signal to other network coding devices that it has taken over network encoding for one or more packets, and the other network coding devices may refrain from performing network encoding for these respective packets.

Aspects of the disclosure are initially described in the context of wireless communications systems. Aspects of the disclosure are further described with reference to process flows. Aspects of the disclosure are further illustrated by and described with reference to apparatus diagrams, system diagrams, and flowcharts that relate to signaling exchange reduction designs for multi-encoder selection.

FIG. 1 illustrates an example of a wireless communications system 100 that supports signaling exchange reduction designs for multi-encoder selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE. LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 utilize network coding techniques in a multi-network coding device system. In some examples, the first network coding device to send an accept-request message to a first UE 115 with respect to a given packet may claim take over of the given packet. In such examples, each network coding device associated with the first UE 115 may define respective backoff periods (e.g., n-slots) such that each of the network coding devices may delay n-slots before sending an accept-request message to the first UE. In some cases, each network coding device may signal to each other an indication of their respective backoff period such that each network coding device may use a different backoff period. Further discussion of backoff periods for network coding are described herein, including with reference to FIGS. 2B and 3.

Additionally or alternatively, the first UE 115 may select a network coding device for take over based on determining a capability associated with each of the network coding devices associated with the first UE 115. For example, the first UE 115 may periodically receive from each network coding device broadcast messages that may include parameters associated with the respective network coding device (e.g., GNSS location, parameters indicating network coding device identification, etc.). Based on receiving the periodic broadcast messages from each network coding device, the UE 115 may choose a network coding device with a given capability (e.g., highest RSRP, shortest distance, etc.) or a network coding device with a capability above a threshold. Further discussion of network coding device selection based on capability is described herein, including with reference to FIGS. 2C and 4.

Figure 2A:
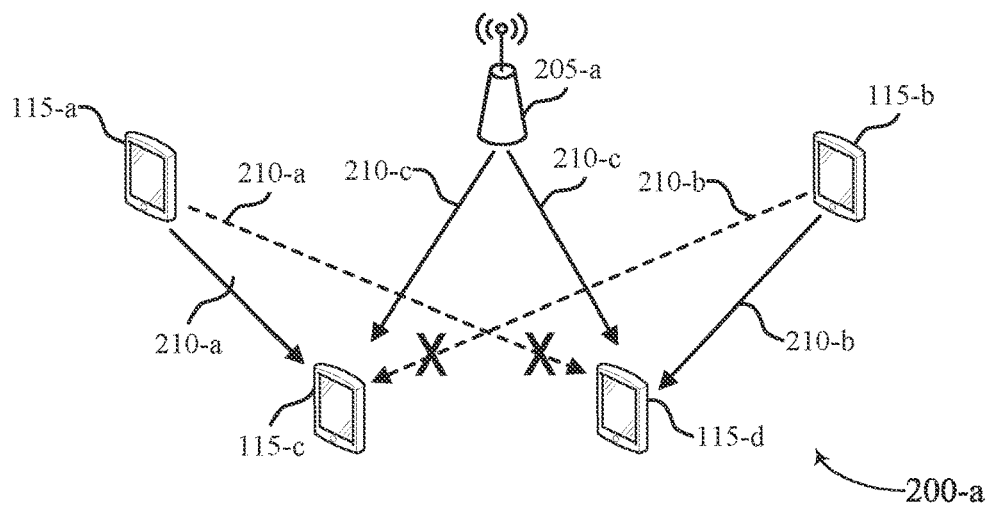
FIG. 2A-2C illustrates respective examples of wireless communications systems that supports signaling exchange reduction designs for multi-encoder selection in accordance with aspects of the present disclosure.

FIG. 2A illustrates an example of a wireless communications system 200-*a* that supports signaling exchange reduction designs for multi-encoder selection in accordance with aspects of the present disclosure. The wireless communications system 200-*a* may implement or be implemented by one or more aspects of the wireless communications system 100. For example, the wireless communications system 200-*a* may include UEs 115-*a* through 115-*d* which may be respective examples of UEs 115, as described with reference to FIG. 1. The wireless communications system 200-*a* may also include a network coding device 205-*a* which may be an example of a 5G smart roadside unit (RSU), a network relay, another UE 115, or a base station 105 as described with reference to FIG. 1. In some examples, the UEs 115 and the network coding device 205-*a* may operate in accordance with network coding techniques to decrease a number of wireless retransmissions. Specifically, if one or more UEs 115 perform one or more wireless transmissions 210 that are not received at one or more other UEs 115, the network coding device 205-*a* may perform network encoding of the multiple unreceived wireless transmissions 210 and combine the unreceived wireless transmissions 210 into one wireless transmission 210. It is noted that, while examples of some numbers of devices and types of devices are described herein, any number of devices and device types may support the techniques described in the present disclosure.

In some examples, network coding techniques may be used to increase system capacity and improve resource utilization of the wireless communications system 200-*a*. This may be achieved by reducing a number of wireless retransmissions in the wireless communications system 200-*a* while maintaining network performance. For example, as illustrated in FIG. 2A, the UE 115-*a* and the UE 115-*b* may transmit respective wireless transmissions 210-*a* and wireless transmissions 210-*b* to both the UE 115-*c* and the UE 115-*d*. In the example of FIG. 2A, the UE 115-*c* may receive the wireless transmission 210-*b* from the UE 115-*b* but may not receive the wireless transmission 210-*a* from the UE 115-*a* and the UE 115-*d* may receive the wireless transmission 210-*a* from the UE 115-*a* but may not receive the wireless transmission 210-*b* from the UE 115-*b*. In some examples, the UE 115-*c* and the UE 115-*d* may not receive one or more wireless transmissions 210 due to channel interference, self-Qualcomm interference, physical barriers (e.g., buildings, trees, passing cars, etc.), among other examples.

According to techniques herein, instead of the UE 115-*a* and the UE 115-*b* performing respective retransmissions of wireless transmission 210-*a* and wireless transmission 210-*b*, the wireless communications system 200-*a* may support network coding. For example, the network coding device 205-*a* may perform network encoding to generate a wireless transmission 210-*c* that is a function of both wireless transmission 210-*a* from the UE 115-*a* and the wireless transmission 210-*b* from the UE 115-*b*. Based on performing network encoding, the network coding device 205-*a* may transmit the wireless transmission 210-*c* to both the UE 115-*c* and the UE 115-*d*, and the UE 115-*c* and the UE 115-*d* may decode the respective wireless transmission 210 that was previously not received (e.g., the UE 115-*c* may decode wireless transmission 210-*b* and the UE 115-*d* may decode wireless transmission 210-*a*). Such techniques of network coding may increase the number of UEs 115 or the amount of wireless traffic at each UE 115 in the wireless communications system 200-*a*.

In some examples, the process of extracting contents of respective wireless transmissions 210 from a network encoded transmission may be based on erasure coding techniques. For example, single parity check codes may correct one wireless transmission 210 erasure from a set of wireless transmissions 210. For instances, if a first input describes a vector [a, b, c] where a, b, and c each describe a wireless transmission 210, then the network coding device 205-*a* may perform network encoding generate a second vector [a, b, c, a⊕b⊕c], where a⊕b⊕c is a combination of a, b, and c. As such, if a UE 115 receives the encoded second vector as [a, ?, c, a⊕b⊕c], where the element b is not received, the UE 115 may use Equation 1 to determine element b:

$$b = a \oplus c \oplus (a \oplus b \oplus c)$$

The example shown in Equation 1 may be generalized as a linear system over a Galois field with three variables and four linearly independent constraints as shown in Equation 2:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T$$

As such, three constraints (e.g., one erasure) may be sufficient to find the contents of the variables a, b, and c. While the erasure coding example described herein may be with reference to three variables, it is noted that wireless communications system 200-*a* may use the techniques of erasure coding for any number of variables.

In some examples, the network coding device 205-*a* may determine to perform network coding based on receiving a network coding request from one or more UEs 115. For example, the UE 115-*a* may transmit to the network coding device 205-*a* a network coding request message that may include a transport block, a coding request flag, and identification of the intended receiving wireless device. If the network coding device 205-*a* accepts take over of the transport block received in the request message, the network coding device 205-*a* may respond to the UE 115-*a* with an acceptance message. As such, the network coding device 205-*a* may perform network encoding on the transport block received in the request message and may transmit the encoded transport block to the wireless device identified in the request message.

Figure 2B:
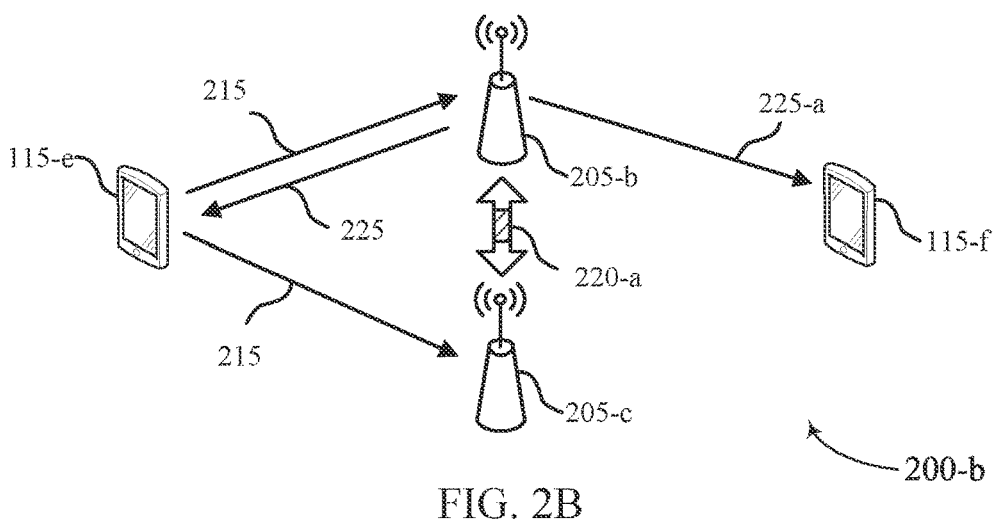
Figure 2C:
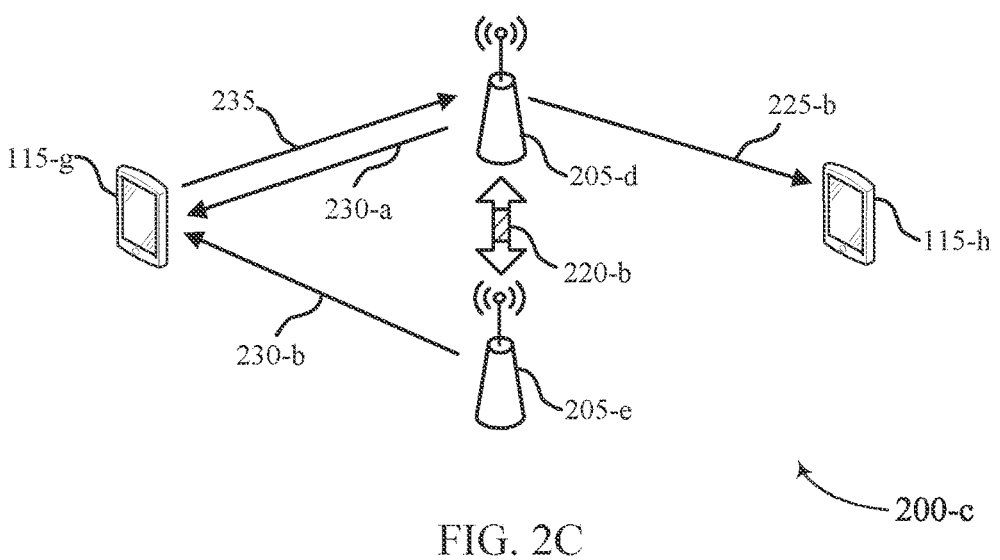

In some cases, however, including with reference to FIGS. 2B and 2C, a UE 115 requesting network coding may be within a geographic location of multiple network coding devices 205. As such, it may be advantageous to reduce the chance that multiple network coding devices 205 taking over a same transport block or packet. For example, to reduce signaling exchange between multiple wireless devices, each packet may be taken over by one network coding device 205, such that there are no duplicate network coding transmissions, which may reduce resource consumption. Examples of techniques employed by wireless communications systems with multiple network coding devices 205 are described herein, including with reference to FIGS. 2B and 2C.

FIG. 2B illustrates an example of a wireless communications system 200-*b* that supports signaling exchange reduction designs for multi-encoder selection in accordance with aspects of the present disclosure. The wireless communications system 200-*b* may implement or be implemented by one or more aspects of the wireless communications system 100 and wireless communications system 200-*a*. For example, the wireless communications system 200-*b* may include a UE 115-*c* and a UE 115-*f* which may be respective examples of UEs 115, as described with reference to FIG. 1. The wireless communications system 200-*b* may also include a network coding device 205-*b* and a network coding device 205-*c* which may be respective examples of a 5G RSU, a network relay, another UE 115, or a base station 105 as described with reference to FIG. 1. In some examples, the wireless devices of wireless communications system 200-*b* may operate in accordance with network coding techniques to reduce multiple network coding devices 205 taking over a same packet or transport block. Specifically, each network coding device 205 may operate in accordance with a respective backoff period which indicates an amount of time to wait before transmitting a network coding accept 225 message for a given network coding request 215 from a UE 115. It is noted that, while examples of some numbers of devices and types of devices are described herein, any number of devices and device types may support the techniques described herein.

As illustrated in wireless communications system 200-*b*, the UE 115-*e* may transmit a network coding request 215 message to the network coding devices 205-*b* and 205-*c*. In some examples, the network coding request 215 message may be an example of a broadcast message or a groupcast message in which the UE 115-*a* includes identification of the intended network coding devices 205. Based on receiving the network coding request 215 message, the network coding device 205-*b* and the network coding device 205-*c* may determine respective backoff periods before transmitting a network coding accept 225 message in response to the UE 115-*e*. For example, a backoff period for each network coding device 205 may be a delay of n-slots to delay transmitting the network coding accept 225 message, and thus block other network coding devices 205 from taking over the packet or transport block indicated in the network coding request 215 message. In some examples, n may be different for each network coding device 205 in the wireless communications system 200-*b* and may have a lower bound of 0 or 1. The value of n for a given network coding device 205 may be randomly generated within a range of [0, N] where N is preconfigured or signaled by a master network coding device 205. For instance, the network coding device 205-*c* may be an example of a master network coding device 205 and during a network coding device signaling 220-*a* session, the network coding device 205-*c* may indicate the value of N to the network coding device 205-*b*. In some examples, the N can be determined by the network coding device 205-*c* based on a packet delay budget (PDB) indicated in a packet header of the network coding request 215 message.

In some cases, during the network coding device signaling 220-a session, the multiple network coding devices 205 may signal to each other their respective n to avoid using the same n. During the network coding device signaling 220-a session, a network coding device 205 may signal to other network coding devices 205 as well as the UE 115-e, that it is overloaded in taking over packets and is pausing network coding. For instance, network coding device 205-c may have the lowest associated n-value for a backoff period, but may indicate an instance of overload to the network coding device 205-b, and as such the network coding device 205-b may accept the network coding request 215 that would have otherwise been accepted by the network coding device 205-c. In some examples, the overload indication may include at least one bit indicating a presence or absence of the overload at the network coding device 205-c, a first time slot associated with a start time for pausing network encoding, a second time slot indicating resumption of network encoding, or a combination thereof. In some examples, the second time slot may be set to the current slot to inform the other network coding devices 205 that the network coding device 205-c has resumed taking over new packets. In some examples, the indication of the second time slot may be at least one bit to inform the other network coding devices 205 that the network coding device 205-c has resumed taking over new packets. The network coding device signaling 220-a session may take place using a sidelink control information-2 (SCI-2) format, a MAC control element (MAC-CE), a MAC header or sub-header, RRC signaling, or a physical or higher layer packet.

Based on the communications related to take over transmitted during the network coding device signaling 220-a session, the network coding device 205-b may determine to transmit the network coding accept 225 message in response to the network coding request 215 message. As such, the network coding device 205-b may encode the packet or transport block received in the network coding request 215 message and perform a network coding transmission 225-a to the UE 115-f which was indicated as the receiving UE 115 in the network coding request 215 message.

FIG. 2C illustrates an example of a wireless communications system 200-c that supports signaling exchange reduction designs for multi-encoder selection in accordance with aspects of the present disclosure. The wireless communications system 200-c may implement or be implemented by one or more aspects of the wireless communications system 100 and wireless communications system 200-a. For example, the wireless communications system 200-c may include a UE 115-g and a UE 115-h which may be respective examples of UEs 115, as described with reference to FIG. 1. The wireless communications system 200-c may also include a network coding device 205-d and a network coding device 205-e which may be respective examples of a 5G RSU, a network relay, another UE 115, or a base station 105 as described with reference to FIG. 1. In some examples, the wireless devices of wireless communications system 200-c may operate in accordance with network coding techniques to reduce multiple network coding devices 205 taking over a same packet or transport block. Specifically, each network coding device 205 may periodically transmit respective network coding device information 230 to the UE 115-g and the UE 115-g may determine a network coding device 205 for network encoding based on the network coding device information 230. It is noted that, while examples of some numbers of devices and types of devices are described herein, any number of devices and device types may support the techniques described herein.

As illustrated in FIG. 2C, the UE 115-g may periodically receive network coding device information 230-a and network coding device information 230-b from the network coding device 205-d and the network coding device 205-e respectively. In some examples, the network coding device information 230 may include a GNSS location for the associated network coding device 205 and at least one parameter indicating that the associated network coding device 205 is a network encoder. In some cases, the network coding device information 230 may be transmitted using SCI-2 format, MAC-CE, a MAC header, or sub-header, RRC signaling, or a physical or higher layer packet.

As such, the UE 115-g may select a network coding device 205 to take over a packet or a transport block based on a capability of the network coding devices 205. For example, the UE 115-g may determine, from the network coding device information 230, a RSRP associated with each respective network coding device 205 as well as a distance of each network coding device 205 from the UE 115-g based on the received GNSS location. In some examples, the UE 115-g may choose the network coding device 205 with the largest associated RSRP or with the shortest physical distance. In some examples, the UE 115-g may compare each RSRP associated with each network coding device 205 to a threshold and randomly choose from a set of network coding devices 205 with an associated RSRP above the threshold. In some examples, the threshold may be preconfigured at the UE 115-g or may be indicated by a master network coding device 205.

In the example of wireless communications system 200-c, the UE 115-g may determine to select the network coding device 205-d to perform network encoding, and may transmit a network coding device selection 235 message conveying the encoder selection result. In some examples, the network coding device selection 235 message may include information of which network coding device 205 is to take over (e.g., such as an RSU ID, which may be included in the SCI-2 format of the UE 115-g packets requested for encoding). In some examples, the network coding device selection 235 message may include a request to the network coding device 205-d to take over all packets or transport blocks for a duration of time. In such examples, the network coding device selection 235 message may include the network coding device 205-d ID, a start time or start slot, an end time or end slot, or a combination thereof. In some cases, the network coding device selection 235 message may be transmitted using SCI-2 format. MAC-CE, a MAC header, or sub-header, RRC signaling, or a physical or higher layer packet.

During a network coding device signaling 220-b session, a network coding device 205 may signal to other network coding devices 205 as well as the UE 115-g, that it is overloaded in taking over packets and is pausing. As such, the UE 115-g may refrain from selecting overloaded network coding devices 205 for take over. For example, the network coding device 205-c may have the largest associated RSRP, but if the network coding device 205-e indicates overload to the UE 115-g, the UE 115-g may determine to select another network coding device 205 (e.g., the network coding device 205-d). In some examples, the overload indication may include at least one bit indicating a presence or absence of the overload at the network coding device 205-c, a first time slot associated with a start time for pausing network encoding, a second time slot indicating resumption of network encoding, or a combination thereof. In some examples, the second time slot may be set to the current slot to inform the other network coding devices 205 that the network coding device 205-*e* has resumed taking over new packets. In some examples, the indication of the second time slot may be at least one bit to inform the other network coding devices 205 that the network coding device 205-*e* has resumed taking over new packets. The network coding device signaling 220-*a* session may take place using a SCI-2 format, a MAC-CE, a MAC header, or sub-header, RRC signaling, or a physical or higher layer packet.

Based on the communications related to take over transmitted during the network coding device signaling 220-*b* session and based on receiving the network coding device selection 235 message, the network coding device 205-*d* may determine to encode the packet or transport block received in the network coding device selection 235 message. As such, the network coding device 205-*d* may perform a network coding transmission 225-*b* to the UE 115-*h* which was indicated as the receiving UE 115 in the network coding device selection 235 message.

In some examples of both FIGS. 2B and 2C, each network coding device 205 may also monitor feedback-collection packets and network coding packets sent by other network coding devices 205 as well as ACK or NACK feedback messages transmitted to other network coding devices 205 by receiving UEs 115 (e.g., the UE 115-*f*). If during monitoring, a first network coding device 205 determines that a second network coding device 205 has taken over one or more packets, the first network coding device 205 may give up the respective packets. In some examples, a network coding device 205 may also signal to other network coding devices 205 the packets it has taken over on or more packets, such that other network coding devices 205 may give up these respective packets. The signal may include a packet ID for each packet taken over and a source ID indicating the UE 115 the packet was received from. In some cases, the signaling may take place using SCI-2 format, MAC-CE, a MAC header, or sub-header, RRC signaling, or a physical or higher layer packet.

Figure 3:
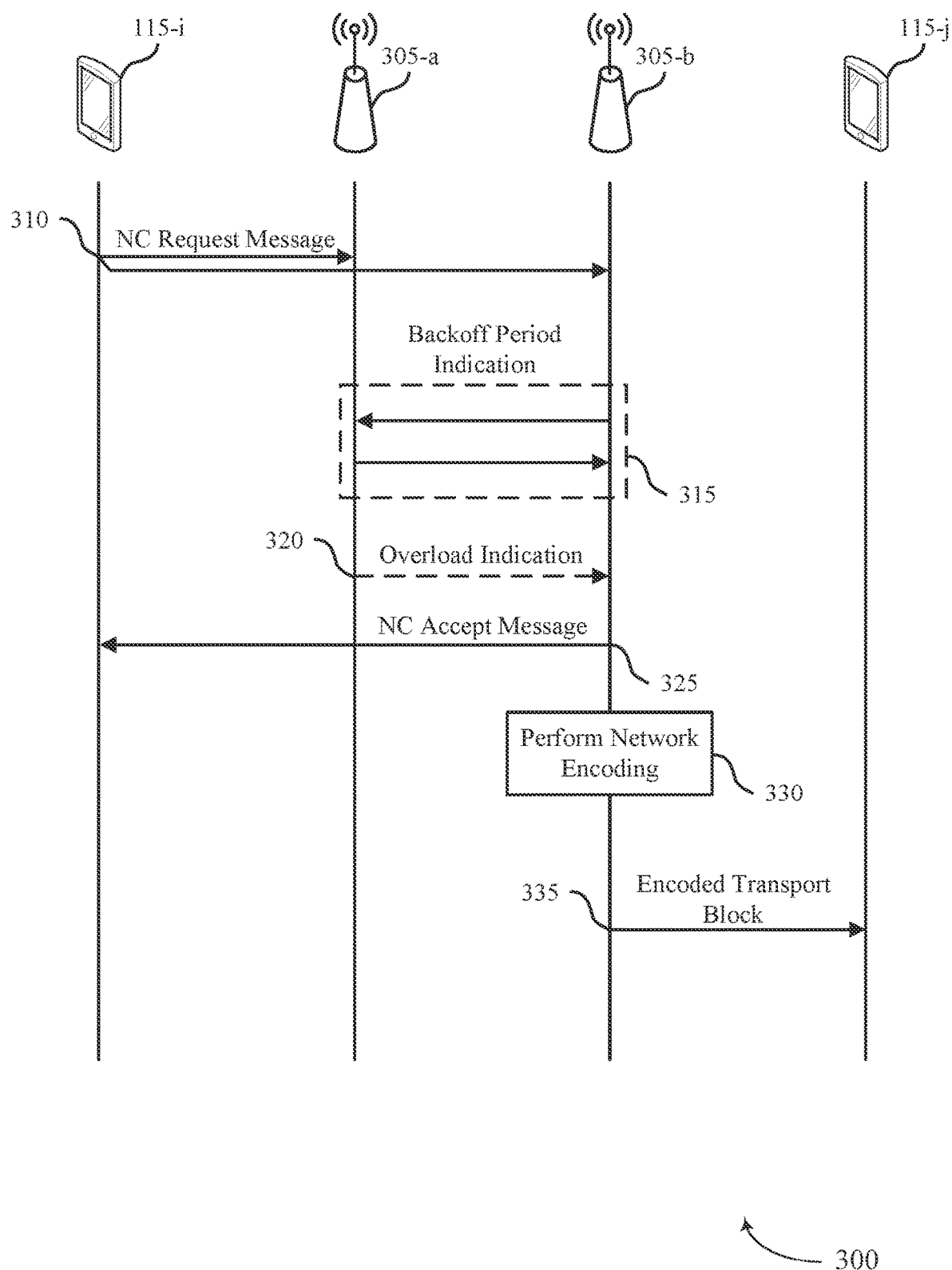
FIG. 3 illustrates an example of a process flow that supports signaling exchange reduction designs for multi-encoder selection in accordance with aspects of the present disclosure.

FIG. 3 illustrates an example of a process flow 300 that supports signaling exchange reduction designs for multi-encoder selection in accordance with aspects of the present disclosure. In some examples, process flow 300 may implement aspects of the wireless communications system 100, the wireless communications system 200-*a*, the wireless communications system 200-*b*, or a combination thereof. The process flow 300 includes a UE 115-*i* and a UE 115-*j* which may be respective examples of a UE 115 with reference to FIG. 1. The process flow 300 may also include a network coding device 305-*a* and a network coding device 305-*b* which may be respective examples of a 5G RSU, a network relay, another UE 115, or a base station 105 as described with reference to FIG. 1. Alternative examples of the following may be implemented, where some steps are performed in a different order than described or are not performed at all. In some cases, steps may include additional features not mentioned below, or further steps may be added. In addition, while process flow 300 shows processes between the UE 115-*i*, the UE 115-*j*, the network coding device 305-*a*, and the network coding device 305-*b*, it should be understood that these processes may occur between any number of network devices.

At 310, the UE 115-*i* may transmit, to the network coding devices 305-*a* and 305-*b*, a network coding request message that includes both a transport block and a request to perform network encoding of the transport block for transmission to the UE 115-*j*.

At 315, each of network coding devices 305 may transmit a backoff period indication which indicates a number of n-slots the respective network coding device 305 may wait before transmitting a network coding accept message in response to the UE 115-*i*. For example, the network coding device 305-*a* may receive from one or more other network coding devices 305, one or more indications of respective backoff periods for each of the one or more other network coding devices 305 and select a backoff period from a set of backoff periods, such that the selected backoff period may be different from the respective received backoff periods. In some examples, the network coding device 305-*a* may randomly select the backoff period from the set of backoff periods. In some cases, the network coding device 305-*b* may be an example of a master network coding device 305 and may configure a maximum backoff period for the set of backoff periods. As such, the network coding device 305-*b* may transmit to each of the other network coding devices 305 an indication if a maximum backoff period for the set of backoff periods. In some examples, the maximum backoff period of the set of backoff periods may be preconfigured at each network coding device 305. In some examples, the set of backoff periods may be based on a packet delay budget associated with the transport block.

In some cases, one or more of the network coding devices 305 may experience overload. For example, at 320, the network coding device 305-*b* may receive from the network coding device 305-*a*, an indication of an overload at the network coding device 305-*a*. In some examples, the indication of overload may include at least on bit indicating a presence or absence of the overload at the network coding device 305-*a*, a first time slot associated with a start time for pausing network encoding at the network coding device 305-*a*, a second time slot indicating resumption of network encoding at the network coding device 305-*a*, or a combination thereof. In some examples, the indication of the second time slot may indicate a current time slot indicating network coding resumption by the second network coding device for the current time slot.

In some cases, a network coding device 305 may receive one or more messages from one or more wireless devices, where the one or more messages may be associated with network encoding of one or more other transport blocks. In some examples, the network coding device 305 may refrain from performing the network encoding of the one or more other transport blocks based on receiving the one or more messages, where the one or more messages include one or more network coded packets, or one or more feedback messages, or a combination thereof. In some examples, the network coding device 305 may transmit, to one or more other network coding devices 305, a take over message indicating that the network coding device 305 is to perform network coding for the one or more other transport blocks. In such examples, the take over message may include a packet identifier of the one or more other transport blocks and a source identifier of the one or more wireless devices.

At 325, the network coding device 305-*b* may transmit, to the UE 115-*i* in a transmission time interval corresponding to the backoff period for network coding requests associated with the network coding device 305-*a*, an acceptance message in response to the message. In some examples, the acceptance message may indicate that the network coding device 305-*b* accepts the request to perform the network encoding of the transport block. At 330, the network coding device 305-*b* may perform network encoding of the transport block for transmission to the UE 115-*j* based on transmitting the acceptance message. At 335, network coding device 305-*b* may transmit, to the UE 115-*j*, the network encoded transport block.

Figure 4:
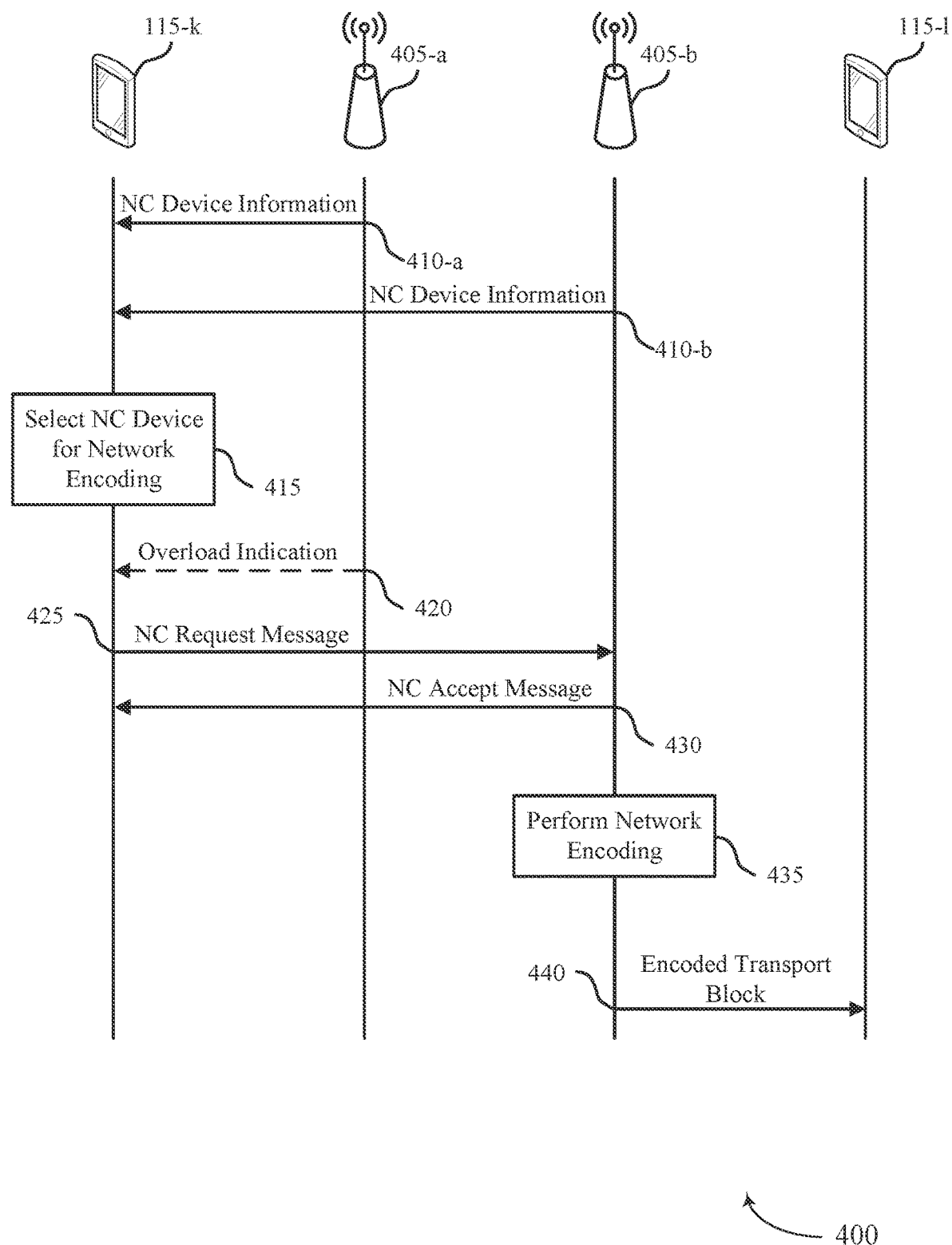
FIG. 4 illustrates an example of a process flow that supports signaling exchange reduction designs for multi-encoder selection in accordance with aspects of the present disclosure.

FIG. 4 illustrates an example of a process flow 400 that supports signaling exchange reduction designs for multi-encoder selection in accordance with aspects of the present disclosure. In some examples, process flow 400 may implement aspects of the wireless communications system 100, the wireless communications system 200-a, the wireless communications system 200-c, or a combination thereof. The process flow 400 includes a UE 115-k and a UE 115-1 which may be respective examples of a UE 115 with reference to FIG. 1. The process flow 400 may also include a network coding device 405-a and a network coding device 405-b which may be respective examples of a 5G RSU, a network relay, another UE 115, or a base station 105 as described with reference to FIG. 1. Alternative examples of the following may be implemented, where some steps are performed in a different order than described or are not performed at all. In some cases, steps may include additional features not mentioned below, or further steps may be added. In addition, while process flow 400 shows processes between the UE 115-k, the UE 115-1, the network coding device 405-a, and the network coding device 405-b, it should be understood that these processes may occur between any number of network devices.

At 410, the UE 115-k may receive a respective broadcast message from each of a set of network coding devices 405 (e.g., network coding devices 405-a and 405-b), where the respective messages indicate a network coding capability for the respective network coding device 405 of the set of network coding devices 405. In some examples, the network coding capability may include a GNSS location associated with a respective network coding device 405, one or more parameters indicating that the respective network coding device 405 is capable of network encoding, or a combination thereof.

At 415, the UE 115-k may select a network coding device 405 from the set of network coding devices 405 based on the network coding capability of the network coding device 405. In some examples, the UE 115-k may select the network coding device 405 based on one or more parameters associated with the network coding device 405, where the one or more parameters include a RSRP associated with the network coding device 405, a signal quality associated with the network coding device 405, a distance of the network coding device 405 relative to the UE 115-k, or a combination thereof. In some examples, the UE 115-k may select the network coding device 405 based on the network coding device 405 having an associated RSRP above a threshold. In some examples, the UE 115-k may receive an indication of the threshold from a master network coding device 405.

In some cases, one or more of the network coding devices 405 may experience overload. For example, at 420, the UE 115-k may receive from the network coding device 405-a, an indication of an overload at the network coding device 405-a. In some examples, the indication of overload may include at least one bit indicating a presence or absence of the overload at the network coding device 405-a, a first time slot associated with a start time for pausing network encoding at the network coding device 405-a, a second time slot indicating resumption of network encoding at the network coding device 405-a, or a combination thereof. In some examples, the indication of the second time slot may indicate a current time slot indicating network coding resumption by the second network coding device for the current time slot.

In some cases, a network coding device 405 may receive one or more messages from one or more wireless devices, where the one or more messages may be associated with network encoding of one or more other transport blocks. In some examples, the network coding device 405 may refrain from performing the network encoding of the one or more other transport blocks based on receiving the one or more messages, where the one or more messages include one or more network coded packets, one or more feedback messages, or a combination thereof. In some examples, the network coding device 405 may transmit, to one or more other network coding devices 405, a take over message indicating that the network coding device 405 is to perform network coding for the one or more other transport blocks. In such examples, the take over message may include a packet identifier of the one or more other transport blocks and a source identifier of the one or more wireless devices.

At 425, the UE 115-k may transmit, to the selected network coding device 405 (e.g., network coding device 405-b), a message including both a transport block and a request to perform network encoding of the transport block for transmission to the UE 115-1. In some examples, the UE 115-k may also transmit an identifier associated with the selected network coding device 405-b in an SCI message. In some examples, the UE 115-k may transmit signaling requesting the selected network coding device 405-b to perform network coding for the UE 115-k for a period of time, where the signaling includes an identifier associated with the selected network coding device 405-b, a start slot time, an end slot time, or a combination thereof.

At 430, the network coding device 405-b may transmit to the UE 115-k an acceptance message in response to the message, where the acceptance message indicates that the network coding device 405-b accepts the request to perform the network encoding of the transport block. At 435, the network coding device 405-b may perform network encoding of the transport block for transmission to the UE 115-1 based on transmitting the acceptance message. At 440, network coding device 405-b may transmit, to the UE 115-1, the network encoded transport block.

Figure 5:
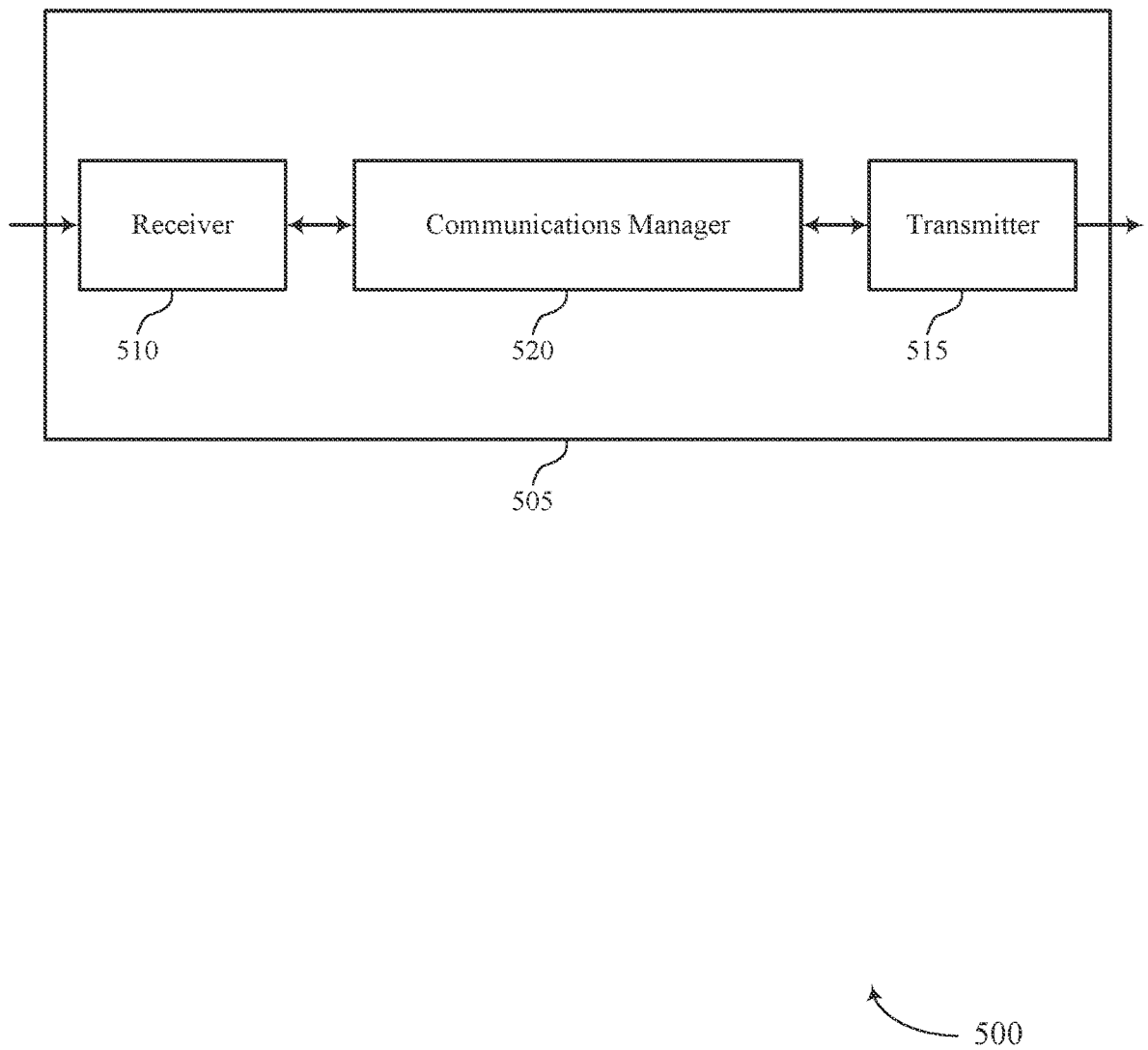
FIGS. 5 and 6 show block diagrams of devices that support signaling exchange reduction designs for multi-encoder selection in accordance with aspects of the present disclosure.

FIG. 5 shows a block diagram 500 of a device 505 that supports signaling exchange reduction designs for multi-encoder selection in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling exchange reduction designs for multi-encoder selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling exchange reduction designs for multi-encoder selection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of signaling exchange reduction designs for multi-encoder selection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a network coding device in accordance with examples as disclosed herein. For example, the communications manager 520 may be configured as or otherwise support a means for receiving, from a UE, a message including both a transport block and a request to perform network encoding of the transport block for transmission to a second UE. The communications manager 520 may be configured as or otherwise support a means for transmitting, to the UE in a transmission time interval corresponding to a backoff period for network coding requests associated with the network coding device, an acceptance message in response to the message, where the acceptance message indicates that the network coding device accepts the request to perform the network encoding of the transport block. The communications manager 520 may be configured as or otherwise support a means for performing network encoding of the transport block for transmission to the second UE after transmitting the acceptance message. The communications manager 520 may be configured as or otherwise support a means for transmitting, to the second UE, the network encoded transport block.

Additionally or alternatively, the communications manager 520 may support wireless communications at a network coding device in accordance with examples as disclosed herein. For example, the communications manager 520 may be configured as or otherwise support a means for transmitting a broadcast message indicating a network coding capability for the network coding device. The communications manager 520 may be configured as or otherwise support a means for receiving, from a UE, a message including a transport block, a request to perform network encoding of the transport block for transmission to a second UE, and an identifier associated with the network coding device. The communications manager 520 may be configured as or otherwise support a means for transmitting, to the UE, an acceptance message in response to the message, where the acceptance message indicates that the network coding device accepts the request to perform the network encoding of the transport block. The communications manager 520 may be configured as or otherwise support a means for transmitting, to the second UE, the network encoded transport block.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing the number of wireless retransmissions and the amount of network encoding which also reduces processing, power consumption, and leads to a more efficient utilization of communication resources.

Figure 6:
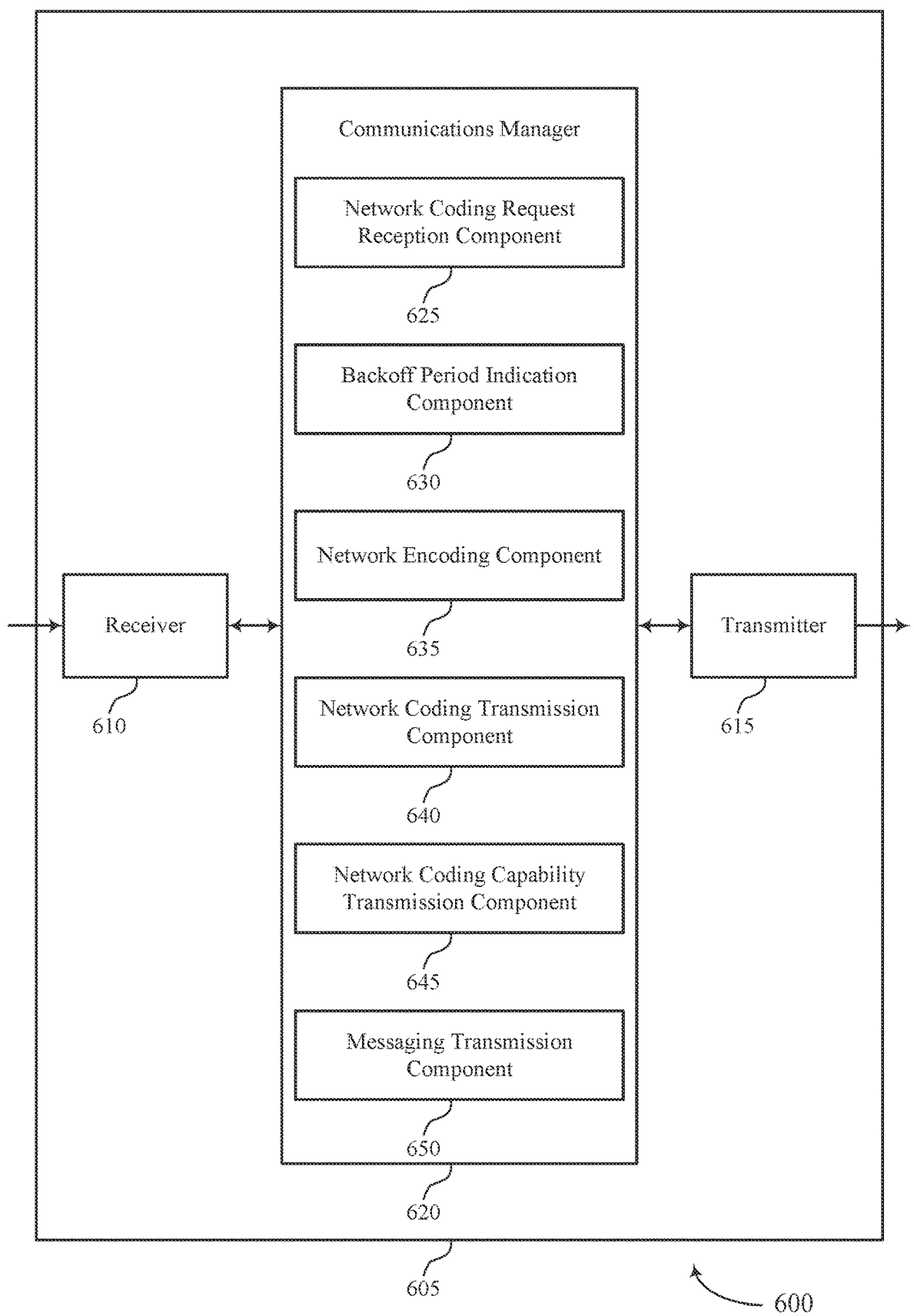

FIG. 6 shows a block diagram 600 of a device 605 that supports signaling exchange reduction designs for multi-encoder selection in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling exchange reduction designs for multi-encoder selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling exchange reduction designs for multi-encoder selection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of signaling exchange reduction designs for multi-encoder selection as described herein. For example, the communications manager 620 may include a network coding request reception component 625, a backoff period indication component 630, a network encoding component 635, a network coding transmission component 640, a network coding capability transmission component 645, a messaging transmission component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a network coding device in accordance with examples as disclosed herein. The network coding request reception component 625 may be configured as or otherwise support a means for receiving, from a UE, a message including both a transport block and a request to perform network encoding of the transport block for transmission to a second UE. The backoff period indication component 630 may be configured as or otherwise support a means for transmitting, to the UE in a transmission time interval corresponding to a backoff period for network coding requests associated with the network coding device, an acceptance message in response to the message, where the acceptance message indicates that the network coding device accepts the request to perform the network encoding of the transport block. The network encoding component 635 may be configured as or otherwise support a means for performing network encoding of the transport block for transmission to the second UE after transmitting the acceptance message. The network coding transmission component 640 may be configured as or otherwise support a means for transmitting, to the second UE, the network encoded transport block.

Additionally or alternatively, the communications manager 620 may support wireless communications at a network coding device in accordance with examples as disclosed herein. The network coding capability transmission component 645 may be configured as or otherwise support a means for transmitting a broadcast message indicating a network coding capability for the network coding device. The network coding request reception component 625 may be configured as or otherwise support a means for receiving, from a UE, a message including a transport block, a request to perform network encoding of the transport block for transmission to a second UE, and an identifier associated with the network coding device. The messaging transmission component 650 may be configured as or otherwise support a means for transmitting, to the UE, an acceptance message in response to the message, where the acceptance message indicates that the network coding device accepts the request to perform the network encoding of the transport block. The network coding transmission component 640 may be configured as or otherwise support a means for transmitting, to the second UE, the network encoded transport block.

Figure 7:
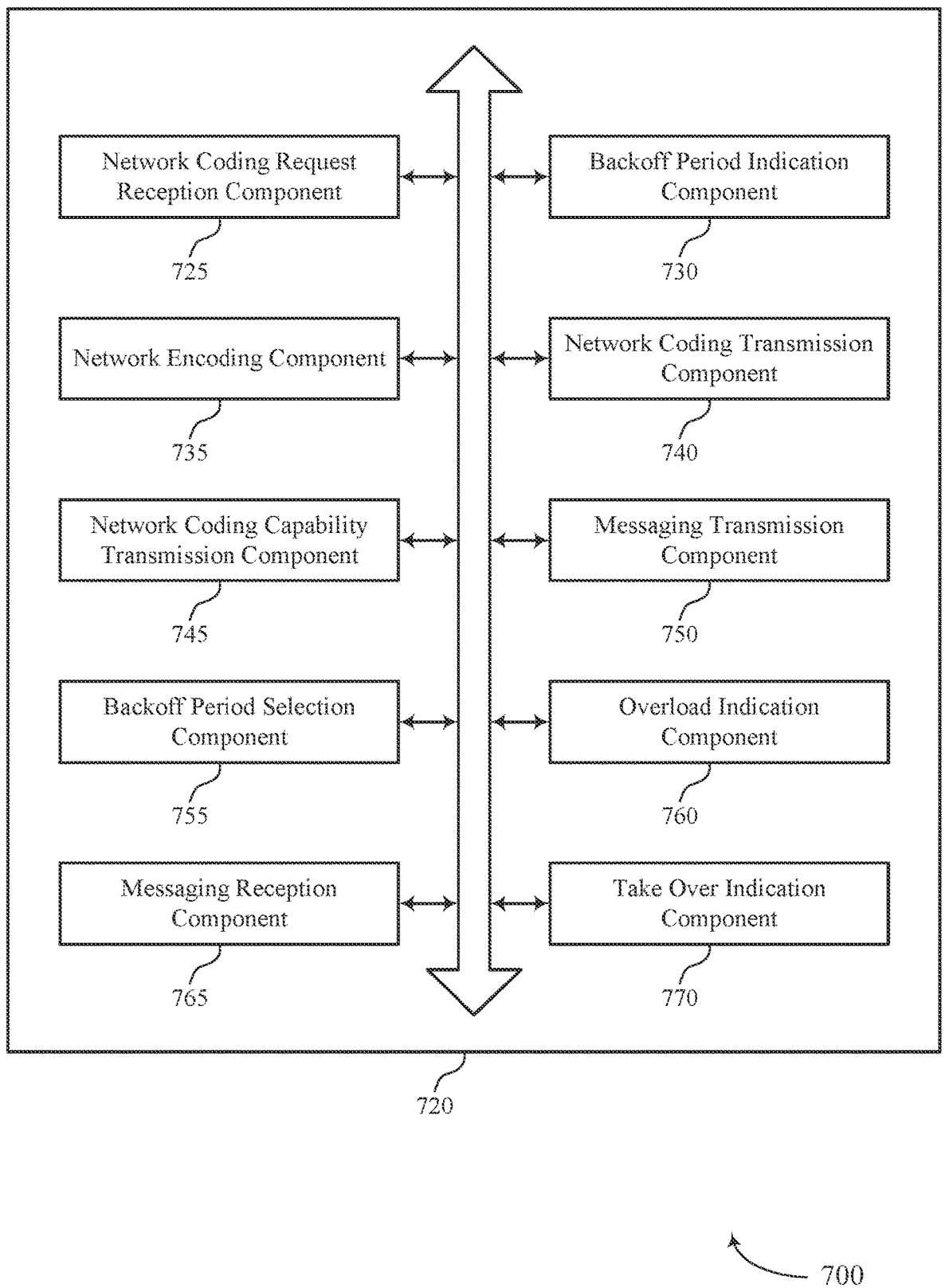
FIG. 7 shows a block diagram of a communications manager that supports signaling exchange reduction designs for multi-encoder selection in accordance with aspects of the present disclosure.

FIG. 7 shows a block diagram 700 of a communications manager 720 that supports signaling exchange reduction designs for multi-encoder selection in accordance with aspects of the present disclosure. The communications manager 720 may be an example of aspects of a communications manager 520, a communications manager 620, or both, as described herein. The communications manager 720, or various components thereof, may be an example of means for performing various aspects of signaling exchange reduction designs for multi-encoder selection as described herein. For example, the communications manager 720 may include a network coding request reception component 725, a backoff period indication component 730, a network encoding component 735, a network coding transmission component 740, a network coding capability transmission component 745, a messaging transmission component 750, a backoff period selection component 755, an overload indication component 760, a messaging reception component 765, a take over indication component 770, or any combination thereof. Each of these components may communicate, directly or indirectly, with one another (e.g., via one or more buses).

The communications manager 720 may support wireless communications at a network coding device in accordance with examples as disclosed herein. The network coding request reception component 725 may be configured as or otherwise support a means for receiving, from a UE, a message including both a transport block and a request to perform network encoding of the transport block for transmission to a second UE. The backoff period indication component 730 may be configured as or otherwise support a means for transmitting, to the UE in a transmission time interval corresponding to a backoff period for network coding requests associated with the network coding device, an acceptance message in response to the message, where the acceptance message indicates that the network coding device accepts the request to perform the network encoding of the transport block. The network encoding component 735 may be configured as or otherwise support a means for performing network encoding of the transport block for transmission to the second UE after transmitting the acceptance message. The network coding transmission component 740 may be configured as or otherwise support a means for transmitting, to the second UE, the network encoded transport block.

In some examples, the backoff period indication component 730 may be configured as or otherwise support a means for receiving, from one or more other network coding devices, one or more indications of respective backoff periods for each of the one or more other network coding devices. In some examples, the backoff period selection component 755 may be configured as or otherwise support a means for selecting the backoff period from a set of backoff periods, where the backoff period is different from the respective backoff periods.

In some examples, to support selecting the backoff period, the backoff period selection component 755 may be configured as or otherwise support a means for randomly selecting the backoff period from the set of backoff periods.

In some examples, the backoff period indication component 730 may be configured as or otherwise support a means for receiving, from a second network coding device, an indication of a maximum backoff period for the set of backoff periods.

In some examples, the set of backoff periods is based on a packet delay budget associated with the transport block.

In some examples, a maximum backoff period of the set of backoff periods is preconfigured at the network coding device.

In some examples, the backoff period indication component 730 may be configured as or otherwise support a means for transmitting an indication of the backoff period to one or more other network coding devices.

In some examples, the overload indication component 760 may be configured as or otherwise support a means for receiving, from a second network coding device, an indication of an overload at the second network coding device, where the acceptance message is transmitted based on the indication of the overload at the second network coding device.

In some examples, to support indication of the overload, the overload indication component 760 may be configured as or otherwise support a means for at least one bit indicating: a presence or absence of the overload at the second network coding device, a first time slot associated with a start time for pausing network encoding at the second network coding device, a second time slot indicating resumption of network encoding at the second network coding device, or a combination thereof.

In some examples, the indication of the second time slot indicates a current time slot indicating network coding resumption by the second network coding device for the current time slot.

In some examples, the messaging reception component 765 may be configured as or otherwise support a means for receiving one or more messages from one or more wireless devices, the one or more messages associated with network encoding of one or more other transport blocks.

In some examples, the network encoding component 735 may be configured as or otherwise support a means for refraining from performing the network encoding of the one or more other transport blocks based on receiving the one or more messages, where the one or more messages includes one or more network coded packets, or one or more feedback messages, or a combination thereof.

In some examples, the take over indication component 770 may be configured as or otherwise support a means for transmitting, to one or more other network coding devices, a take over message indicating that the network coding device is to perform network coding for the one or more other transport blocks.

In some examples, to support take over message, the take over indication component 770 may be configured as or otherwise support a means for a packet identifier of the one or more other transport blocks and a source identifier of the one or more wireless devices.

Additionally or alternatively, the communications manager 720 may support wireless communications at a network coding device in accordance with examples as disclosed herein. The network coding capability transmission component 745 may be configured as or otherwise support a means for transmitting a broadcast message indicating a network coding capability for the network coding device. In some examples, the network coding request reception component 725 may be configured as or otherwise support a means for receiving, from a UE, a message including a transport block, a request to perform network encoding of the transport block for transmission to a second UE, and an identifier associated with the network coding device. The messaging transmission component 750 may be configured as or otherwise support a means for transmitting, to the UE, an acceptance message in response to the message, where the acceptance message indicates that the network coding device accepts the request to perform the network encoding of the transport block. In some examples, the network coding transmission component 740 may be configured as or otherwise support a means for transmitting, to the second UE, the network encoded transport block.

In some examples, the messaging transmission component 750 may be configured as or otherwise support a means for receiving, from the UE, signaling requesting the network coding device to perform network coding for the UE for a period of time, where the signaling includes an identifier associated with the network coding device, a start slot time, an end slot time, or a combination thereof.

In some examples, the overload indication component 760 may be configured as or otherwise support a means for receiving, from a second network coding device, an indication of an overload at the second network coding device, where the acceptance message is transmitted based on the indication of the overload at the second network coding device. In some examples, the messaging transmission component 750 may be configured as or otherwise support a means for transmitting, to the UE, the acceptance message based on receiving the indication of the overload at the second network coding device.

In some examples, the messaging reception component 765 may be configured as or otherwise support a means for receiving one or more messages from one or more wireless devices, the one or more messages associated with network encoding of one or more other transport blocks.

In some examples, the network encoding component 735 may be configured as or otherwise support a means for refraining from performing the network encoding of the one or more other transport blocks based on receiving the one or more messages, where the one or more messages includes one or more network coded packets, or one or more feedback messages, or a combination thereof.

In some examples, the take over indication component 770 may be configured as or otherwise support a means for transmitting, to one or more other network coding devices, a take over message indicating that the network encoding device is to perform network coding for the one or more other transport blocks.

In some examples, to support take over message, the take over indication component 770 may be configured as or otherwise support a means for a packet identifier of the one or more other transport blocks and a source identifier of the one or more wireless devices.

Figure 8:
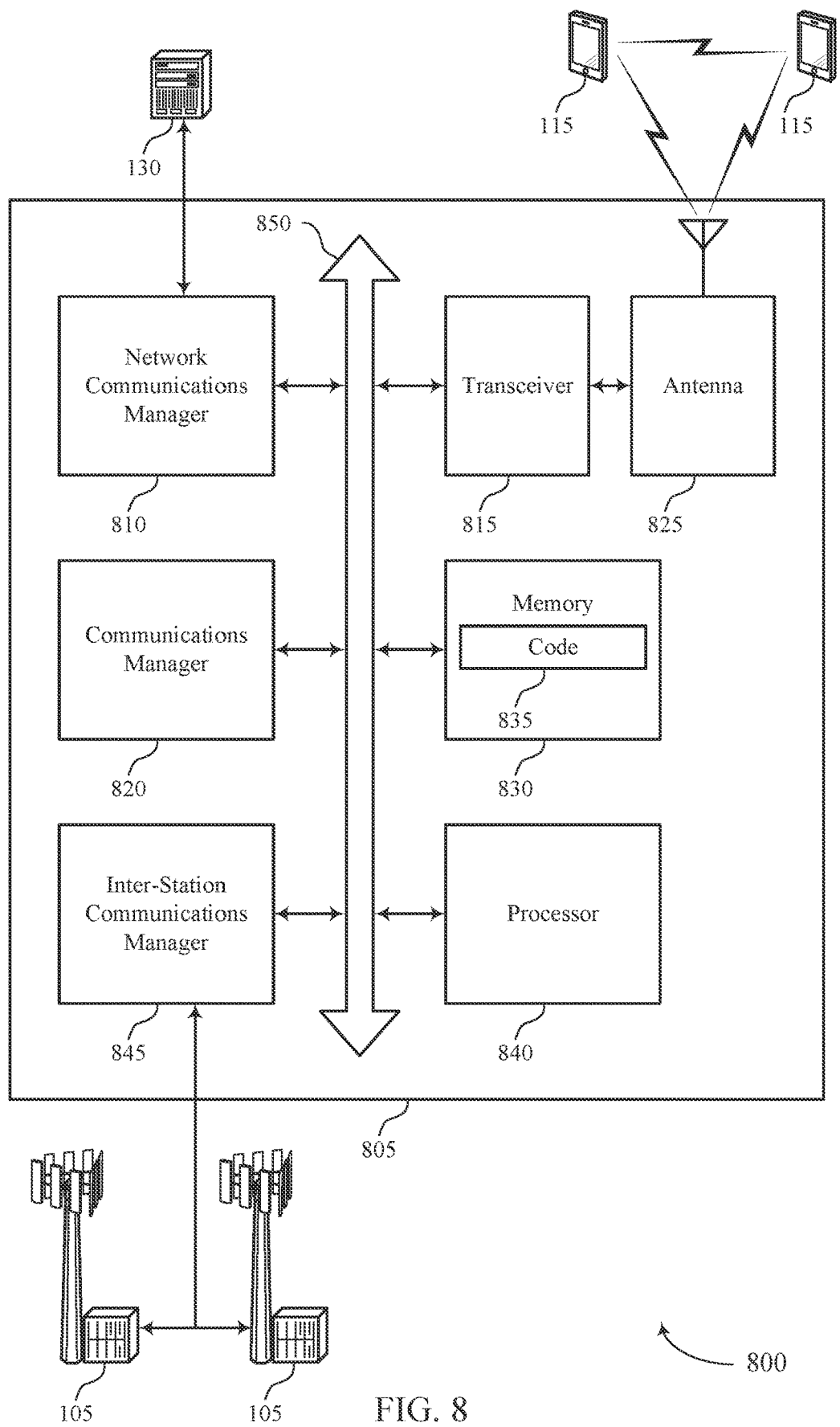
FIG. 8 shows a diagram of a system including a device that supports signaling exchange reduction designs for multi-encoder selection in accordance with aspects of the present disclosure.

FIG. 8 shows a diagram of a system 800 including a device 805 that supports signaling exchange reduction designs for multi-encoder selection in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling exchange reduction designs for multi-encoder selection). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a network coding device in accordance with examples as disclosed herein. For example, the communications manager 820 may be configured as or otherwise support a means for receiving, from a UE, a message including both a transport block and a request to perform network encoding of the transport block for transmission to a second UE. The communications manager 820 may be configured as or otherwise support a means for transmitting, to the UE in a transmission time interval corresponding to a backoff period for network coding requests associated with the network coding device, an acceptance message in response to the message, where the acceptance message indicates that the network coding device accepts the request to perform the network encoding of the transport block. The communications manager 820 may be configured as or otherwise support a means for performing network encoding of the transport block for transmission to the second UE after transmitting the acceptance message. The communications manager 820 may be configured as or otherwise support a means for transmitting, to the second UE, the network encoded transport block.

Additionally or alternatively, the communications manager 820 may support wireless communications at a network coding device in accordance with examples as disclosed herein. For example, the communications manager 820 may be configured as or otherwise support a means for transmitting a broadcast message indicating a network coding capability for the network coding device. The communications manager 820 may be configured as or otherwise support a means for receiving, from a UE, a message including a transport block, a request to perform network encoding of the transport block for transmission to a second UE, and an identifier associated with the network coding device. The communications manager 820 may be configured as or otherwise support a means for transmitting, to the UE, an acceptance message in response to the message, where the acceptance message indicates that the network coding device accepts the request to perform the network encoding of the transport block. The communications manager 820 may be configured as or otherwise support a means for transmitting, to the second UE, the network encoded transport block.

By including or configuring the communications manager 820 in accordance with examples as described herein, the device 805 may support techniques for reducing the number of wireless retransmissions and the amount of network encoding which also improves communication reliability, reduces latency, improves user experience related to reduced processing, reduces power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of signaling exchange reduction designs for multi-encoder selection as described herein, or the processor 840 and the memory 830 may be otherwise configured to perform or support such operations.

Figure 9:
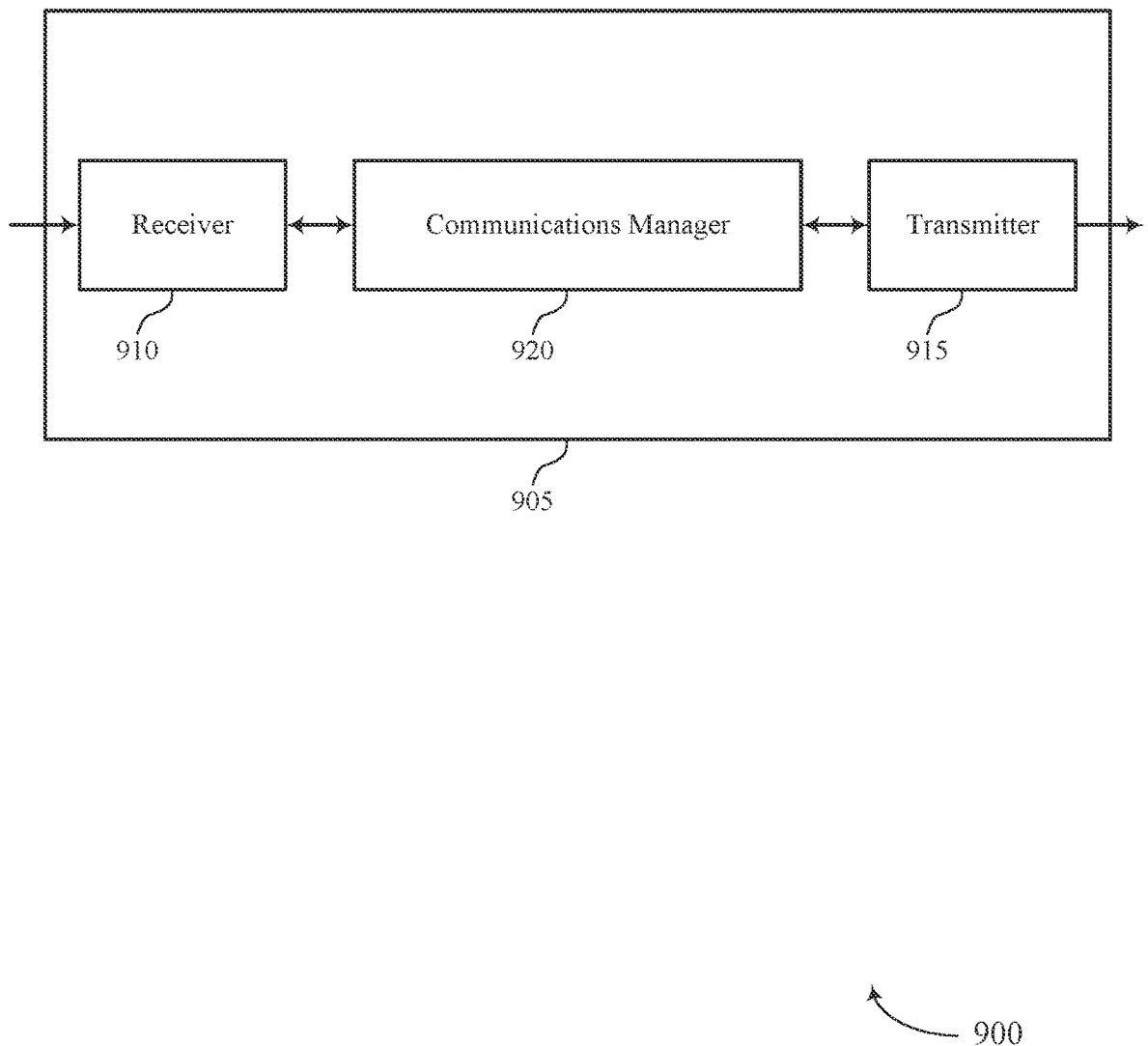
FIGS. 9 and 10 show block diagrams of devices that support signaling exchange reduction designs for multi-encoder selection in accordance with aspects of the present disclosure.

FIG. 9 shows a block diagram 900 of a device 905 that supports signaling exchange reduction designs for multi-encoder selection in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to signaling exchange reduction designs for multi-encoder selection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to signaling exchange reduction designs for multi-encoder selection). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of signaling exchange reduction designs for multi-encoder selection as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving a respective broadcast message from each of a set of network coding devices, where the respective messages indicate a network coding capability for the respective network coding device of the set of network coding devices. The communications manager 920 may be configured as or otherwise support a means for selecting a network coding device from the set of network coding devices based on the network coding capability of the network coding device. The communications manager 920 may be configured as or otherwise support a means for transmitting, to the selected network coding device, a message including both a transport block and a request to perform network encoding of the transport block for transmission to a second UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reducing the number of wireless retransmissions and the amount of network encoding which also reduces processing, power consumption, and leads to a more efficient utilization of communication resources.

Figure 10:
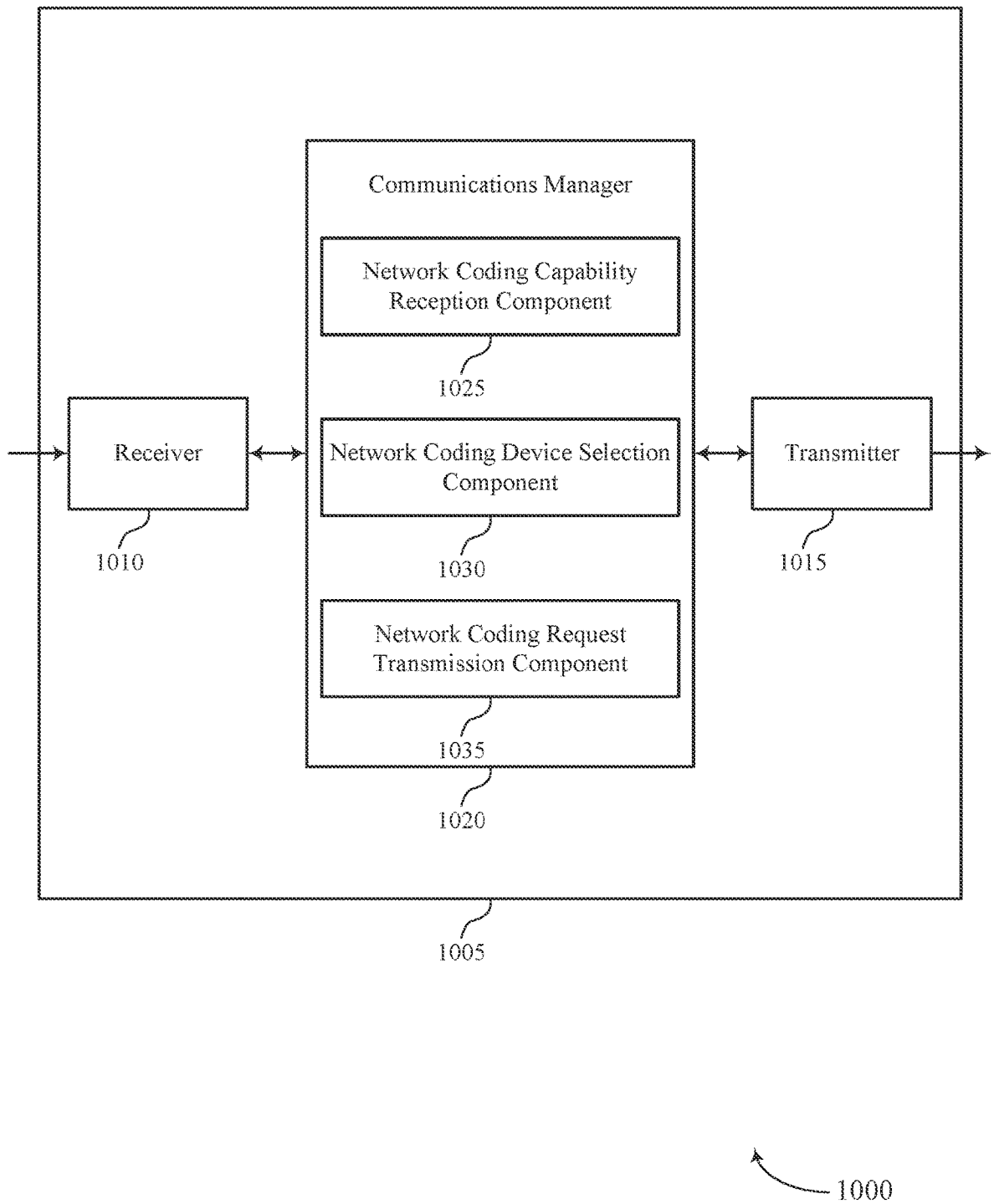

FIG. 10 shows a block diagram 1000 of a device 1005 that supports signaling exchange reduction designs for multi-encoder selection in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signaling exchange reduction designs for multi-encoder selection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signaling exchange reduction designs for multi-encoder selection). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of signaling exchange reduction designs for multi-encoder selection as described herein. For example, the communications manager 1020 may include a network coding capability reception component 1025, a network coding device selection component 1030, a network coding request transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The network coding capability reception component 1025 may be configured as or otherwise support a means for receiving a respective broadcast message from each of a set of network coding devices, where the respective messages indicate a network coding capability for the respective network coding device of the set of network coding devices. The network coding device selection component 1030 may be configured as or otherwise support a means for selecting a network coding device from the set of network coding devices based on the network coding capability of the network coding device. The network coding request transmission component 1035 may be configured as or otherwise support a means for transmitting, to the selected network coding device, a message including both a transport block and a request to perform network encoding of the transport block for transmission to a second UE.

Figure 11:
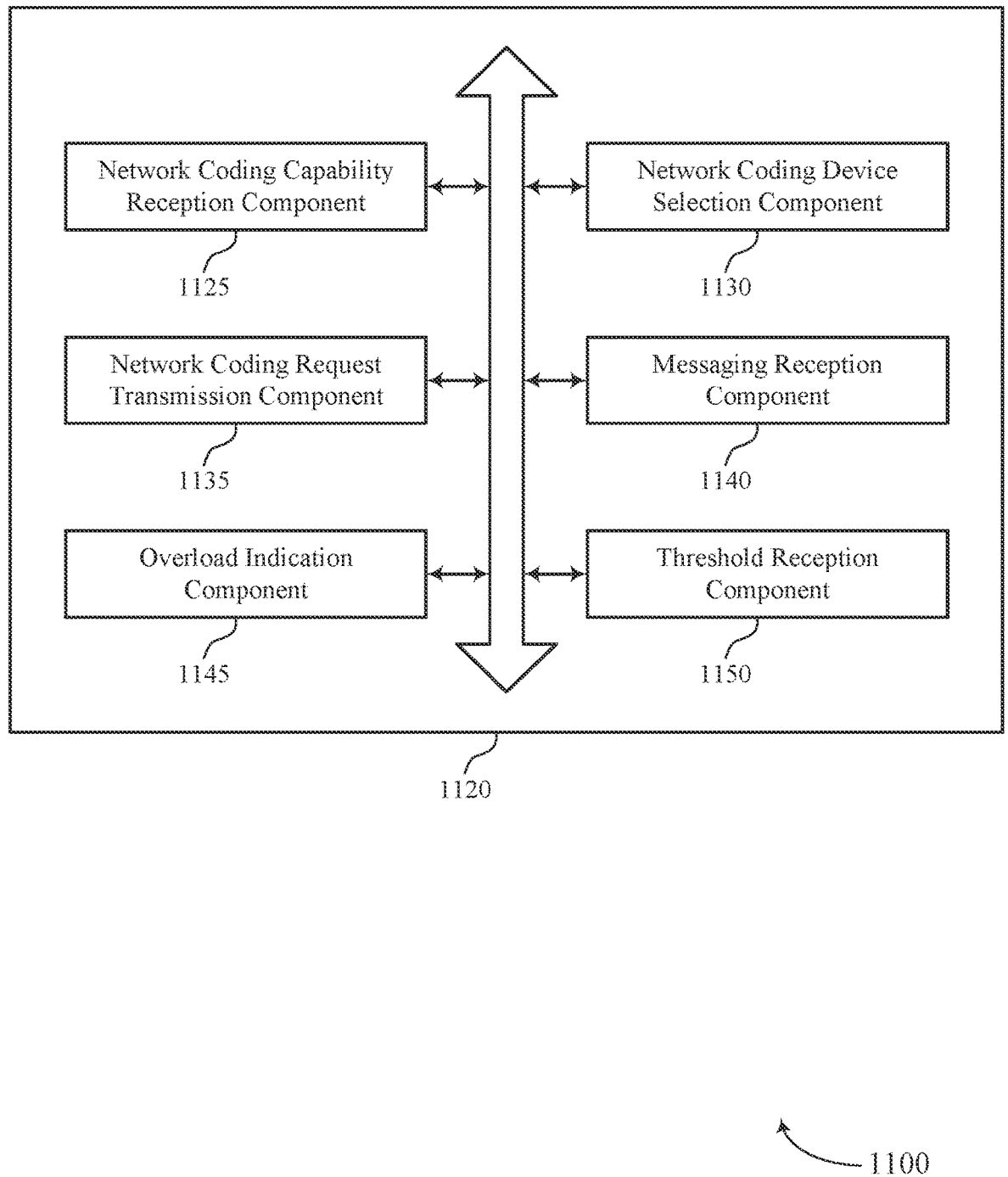
FIG. 11 shows a block diagram of a communications manager that supports signaling exchange reduction designs for multi-encoder selection in accordance with aspects of the present disclosure.

FIG. 11 shows a block diagram 1100 of a communications manager 1120 that supports signaling exchange reduction designs for multi-encoder selection in accordance with aspects of the present disclosure. The communications manager 1120 may be an example of aspects of a communications manager 920, a communications manager 1020, or both, as described herein. The communications manager 1120, or various components thereof, may be an example of means for performing various aspects of signaling exchange reduction designs for multi-encoder selection as described herein. For example, the communications manager 1120 may include a network coding capability reception component 1125, a network coding device selection component 1130, a network coding request transmission component 1135, a messaging reception component 1140, an overload indication component 1145, a threshold reception component 1150, or any combination thereof. Each of these components may communicate, directly or indirectly, with one another (e.g., via one or more buses).

The communications manager 1120 may support wireless communications at a UE in accordance with examples as disclosed herein. The network coding capability reception component 1125 may be configured as or otherwise support a means for receiving a respective broadcast message from each of a set of network coding devices, where the respective messages indicate a network coding capability for the respective network coding device of the set of network coding devices. The network coding device selection component 1130 may be configured as or otherwise support a means for selecting a network coding device from the set of network coding devices based on the network coding capability of the network coding device. The network coding request transmission component 1135 may be configured as or otherwise support a means for transmitting, to the selected network coding device, a message including both a transport block and a request to perform network encoding of the transport block for transmission to a second UE.

In some examples, the network coding request transmission component 1135 may be configured as or otherwise support a means for transmitting an identifier associated with the selected network coding device in a sidelink control information message.

In some examples, the network coding request transmission component 1135 may be configured as or otherwise support a means for transmitting signaling requesting the selected network coding device to perform network coding for the UE for a period of time, where the signaling includes an identifier associated with the selected network coding device, a start slot time, an end slot time, or a combination thereof.

In some examples, to support network coding capability, the network coding capability reception component 1125 may be configured as or otherwise support a means for a global navigation satellite system location associated with a respective network coding device, one or more parameters indicating that the respective network coding device is capable of network encoding, or a combination thereof.

In some examples, the network coding device selection component 1130 may be configured as or otherwise support a means for selecting the network coding device based on one or more parameters associated with the network coding device, where the one or more parameters include a reference signal received power associated with the network coding device, a signal quality associated with the network coding device, a distance of the network coding device relative to the UE, or a combination thereof.

In some examples, the network coding device selection component 1130 may be configured as or otherwise support a means for selecting the network coding device based on the network coding device with the reference signal received power above a threshold.

In some examples, the threshold reception component 1150 may be configured as or otherwise support a means for receiving an indication of the threshold from a second network coding device.

In some examples, the messaging reception component 1140 may be configured as or otherwise support a means for receiving an acceptance message from the network coding device in response to the message, where the acceptance message indicates that the network coding device accepts the request to perform the network encoding of the transport block.

In some examples, the overload indication component 1145 may be configured as or otherwise support a means for receiving, from a second network coding device, an indication of an overload at the second network coding device. In some examples, the network coding device selection component 1130 may be configured as or otherwise support a means for refraining from selecting the second network coding device from the set of network coding devices based on the indication of the overload.

In some examples, to support indication of the overload, the overload indication component 1145 may be configured as or otherwise support a means for at least one bit indicating: a presence or absence of the overload at the second network coding device, a first time slot indicating a start time for pausing network coding at the second network coding device, a second time slot indicating resumption of network coding at the second network coding device, or a combination thereof.

In some examples, the indication of the second time slot indicates a current time slot indicating network coding resumption by the second network coding device for the current time slot.

Figure 12:
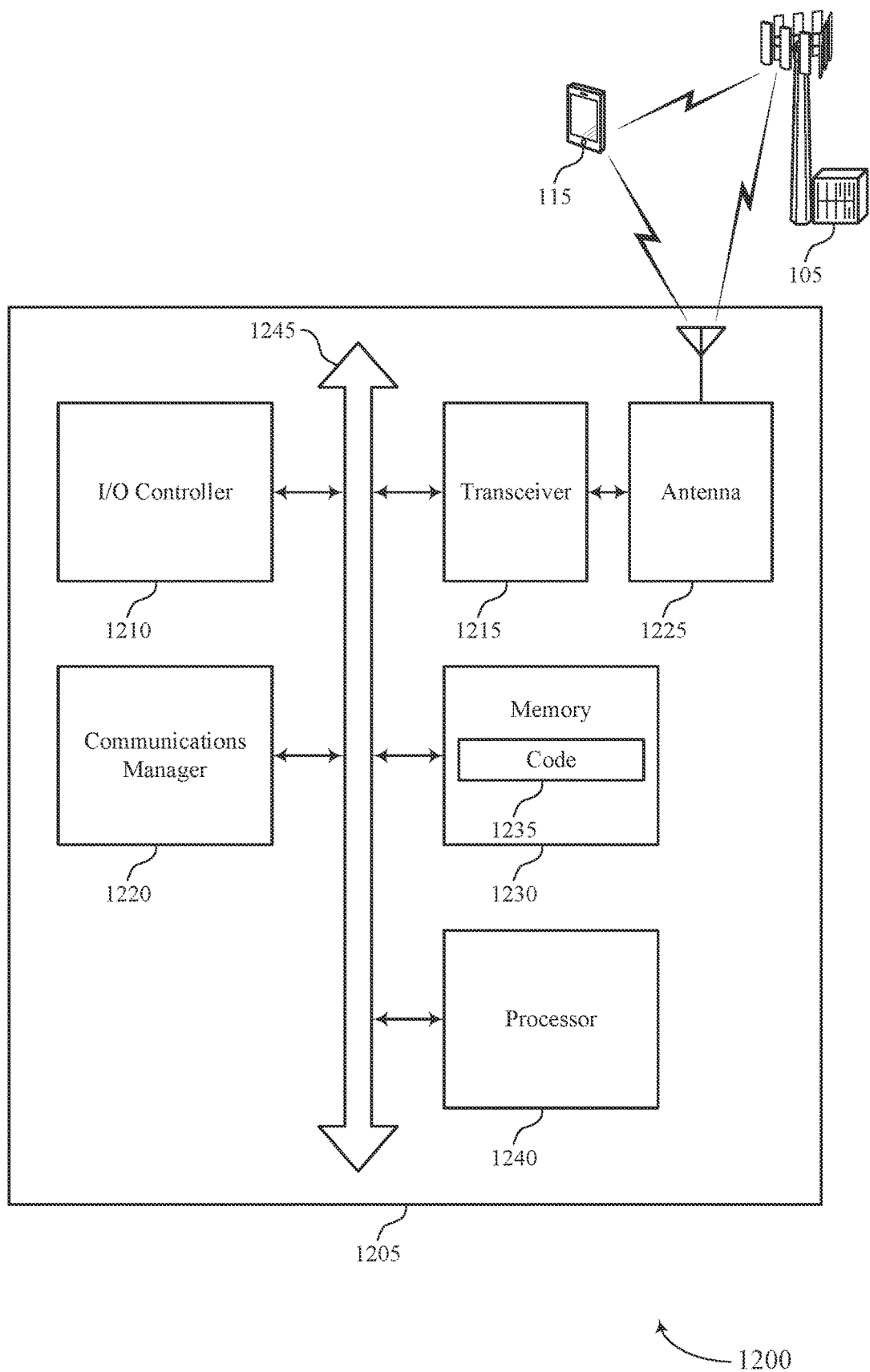
FIG. 12 shows a diagram of a system including a device that supports signaling exchange reduction designs for multi-encoder selection in accordance with aspects of the present disclosure.

FIG. 12 shows a diagram of a system 1200 including a device 1205 that supports signaling exchange reduction designs for multi-encoder selection in accordance with aspects of the present disclosure. The device 1205 may be an example of or include the components of a device 905, a device 1005, or a UE 15 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting signaling exchange reduction designs for multi-encoder selection). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving a respective broadcast message from each of a set of network coding devices, where the respective messages indicate a network coding capability for the respective network coding device of the set of network coding devices. The communications manager 1220 may be configured as or otherwise support a means for selecting a network coding device from the set of network coding devices based on the network coding capability of the network coding device. The communications manager 1220 may be configured as or otherwise support a means for transmitting, to the selected network coding device, a message including both a transport block and a request to perform network encoding of the transport block for transmission to a second UE.

By including or configuring the communications manager 1220 in accordance with examples as described herein, the device 1205 may support techniques for reducing the number of wireless retransmissions and the amount of network encoding which also improves communication reliability, reduces latency, improves user experience related to reduced processing, reduces power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of signaling exchange reduction designs for multi-encoder selection as described herein, or the processor 1240 and the memory 1230 may be otherwise configured to perform or support such operations.

Figure 13:
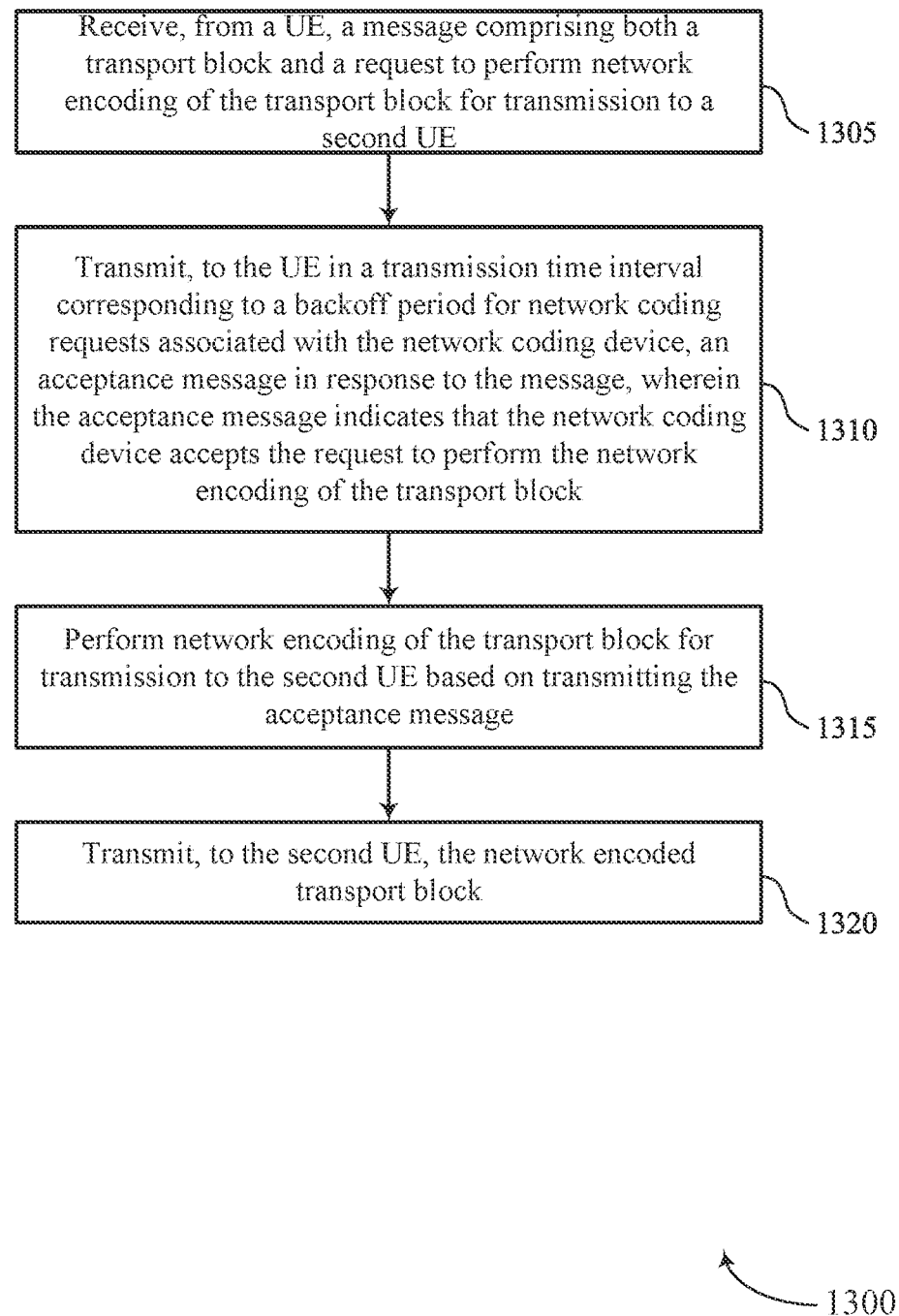
FIGS. 13 through 15 show flowcharts illustrating methods that support signaling exchange reduction designs for multi-encoder selection in accordance with aspects of the present disclosure.

FIG. 13 shows a flowchart illustrating a method 1300 that supports signaling exchange reduction designs for multi-encoder selection in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include receiving, from a UE, a message including both a transport block and a request to perform network encoding of the transport block for transmission to a second UE. The operations of 1305 may be performed in accordance with examples as disclosed herein. In some examples, aspects of the operations of 1305 may be performed by a network coding request reception component 725 as described with reference to FIG. 7.

At 1310, the method may include transmitting, to the UE in a transmission time interval corresponding to a backoff period for network coding requests associated with the network coding device, an acceptance message in response to the message, where the acceptance message indicates that the network coding device accepts the request to perform the network encoding of the transport block. The operations of 1310 may be performed in accordance with examples as disclosed herein. In some examples, aspects of the operations of 1310 may be performed by a backoff period indication component 730 as described with reference to FIG. 7.

At 1315, the method may include performing network encoding of the transport block for transmission to the second UE after transmitting the acceptance message. The operations of 1315 may be performed in accordance with examples as disclosed herein. In some examples, aspects of the operations of 1315 may be performed by a network encoding component 735 as described with reference to FIG. 7.

At 1320, the method may include transmitting, to the second UE, the network encoded transport block. The operations of 1320 may be performed in accordance with examples as disclosed herein. In some examples, aspects of the operations of 1320 may be performed by a network coding transmission component 740 as described with reference to FIG. 7.

Figure 14:
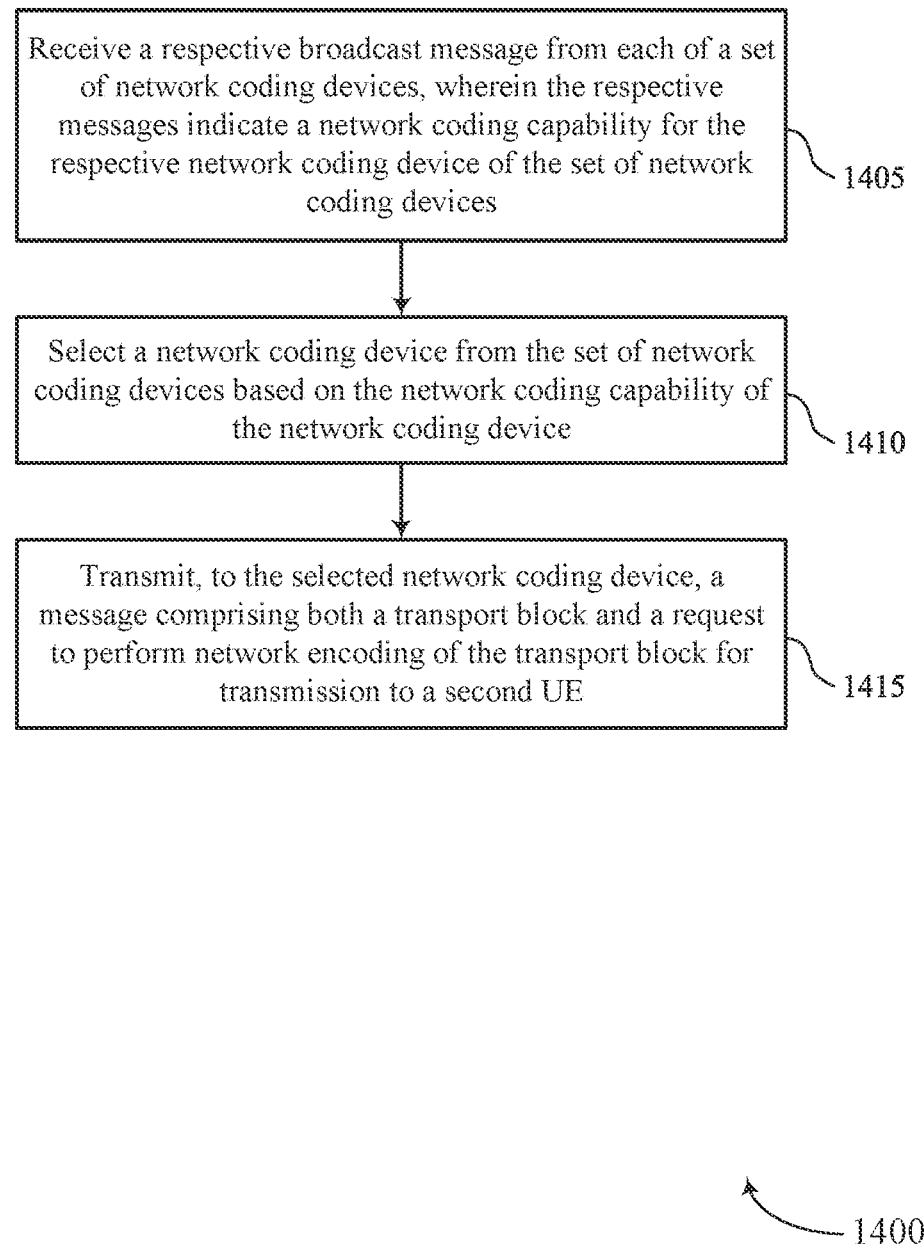

FIG. 14 shows a flowchart illustrating a method 1400 that supports signaling exchange reduction designs for multi-encoder selection in accordance with aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1405, the method may include receiving a respective broadcast message from each of a set of network coding devices, where the respective messages indicate a network coding capability for the respective network coding device of the set of network coding devices. The operations of 1405 may be performed in accordance with examples as disclosed herein. In some examples, aspects of the operations of 1405 may be performed by a network coding capability reception component 1125 as described with reference to FIG. 11.

At 1410, the method may include selecting a network coding device from the set of network coding devices based on the network coding capability of the network coding device. The operations of 1410 may be performed in accordance with examples as disclosed herein. In some examples, aspects of the operations of 1410 may be performed by a network coding device selection component 1130 as described with reference to FIG. 11.

At 1415, the method may include transmitting, to the selected network coding device, a message including both a transport block and a request to perform network encoding of the transport block for transmission to a second UE. The operations of 1415 may be performed in accordance with examples as disclosed herein. In some examples, aspects of the operations of 1415 may be performed by a network coding request transmission component 1135 as described with reference to FIG. 11.

Figure 15:
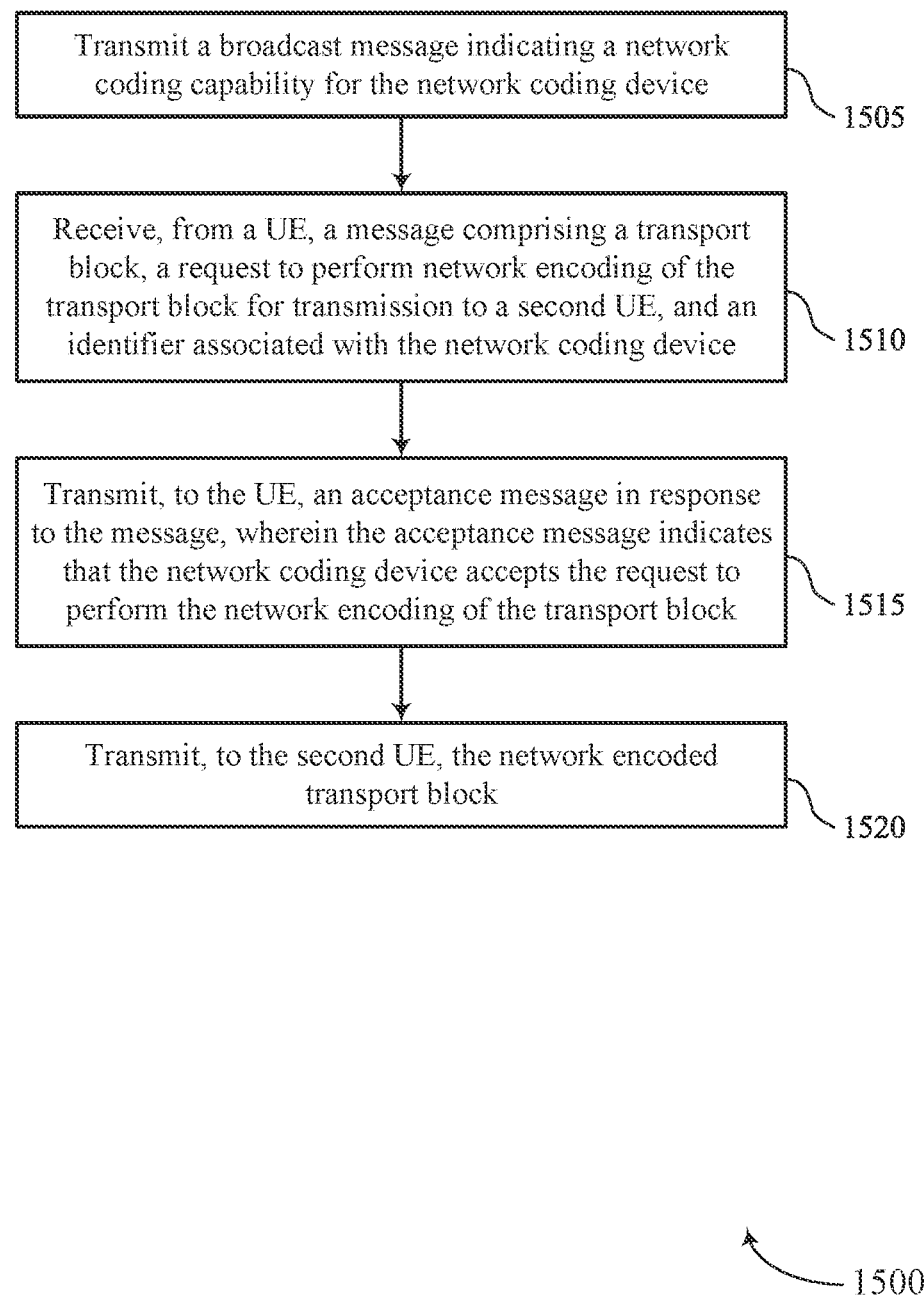

FIG. 15 shows a flowchart illustrating a method 1500 that supports signaling exchange reduction designs for multi-encoder selection in accordance with aspects of the present disclosure. The operations of the method 1500 may be implemented by a base station or its components as described herein. For example, the operations of the method 1500 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1505, the method may include transmitting a broadcast message indicating a network coding capability for the network coding device. The operations of 1505 may be performed in accordance with examples as disclosed herein. In some examples, aspects of the operations of 1505 may be performed by a network coding capability transmission component 745 as described with reference to FIG. 7.

At 1510, the method may include receiving, from a UE, a message including a transport block, a request to perform network encoding of the transport block for transmission to a second UE, and an identifier associated with the network coding device. The operations of 1510 may be performed in accordance with examples as disclosed herein. In some examples, aspects of the operations of 1510 may be performed by a network coding request reception component 725 as described with reference to FIG. 7.

At 1515, the method may include transmitting, to the UE, an acceptance message in response to the message, where the acceptance message indicates that the network coding device accepts the request to perform the network encoding of the transport block. The operations of 1515 may be performed in accordance with examples as disclosed herein. In some examples, aspects of the operations of 1515 may be performed by a messaging transmission component 750 as described with reference to FIG. 7.

At 1520, the method may include transmitting, to the second UE, the network encoded transport block. The operations of 1520 may be performed in accordance with examples as disclosed herein. In some examples, aspects of the operations of 1520 may be performed by a network coding transmission component 740 as described with reference to FIG. 7.

The following provides an overview of aspects of the present disclosure:

Aspect 1: A method for wireless communications at a network coding device, including: receiving, from a UE, a message including both a transport block and a request to perform network encoding of the transport block for transmission to a second UE; transmitting, to the UE in a TTI corresponding to a backoff period for network coding requests associated with the network coding device, an acceptance message in response to the message, where the acceptance message indicates that the network coding device accepts the request to perform the network encoding of the transport block; performing network encoding of the transport block for transmission to the second UE after transmitting the acceptance message; and transmitting, to the second UE, the network encoded transport block.

Aspect 2: The method of aspect 1, further including: receiving, from one or more other network coding devices, one or more indications of respective backoff periods for each of the one or more other network coding devices; and selecting the backoff period from a set of backoff periods, where the backoff period is different from the respective backoff periods.

Aspect 3: The method of aspect 2, where selecting the backoff period includes: randomly selecting the backoff period from the set of backoff periods.

Aspect 4: The method of any of aspects 2 through 3, further including: receiving, from a second network coding device, an indication of a maximum backoff period for the set of backoff periods.

Aspect 5: The method of any of aspects 2 through 4, where the set of backoff periods is based on a packet delay budget associated with the transport block.

Aspect 6: The method of any of aspects 2 through 5, where a maximum backoff period of the set of backoff periods is preconfigured at the network coding device.

Aspect 7: The method of any of aspects 1 through 6, further including: transmitting an indication of the backoff period to one or more other network coding devices.

Aspect 8: The method of any of aspects 1 through 7, further including: receiving, from a second network coding device, an indication of an overload at the second network coding device, where the acceptance message is transmitted based on the indication of the overload at the second network coding device.

Aspect 9: The method of aspect 8, where the indication of the overload includes: at least one bit indicating: a presence or absence of the overload at the second network coding device, a first time slot associated with a start time for pausing network encoding at the second network coding device, a second time slot indicating resumption of network encoding at the second network coding device, or a combination thereof.

Aspect 10: The method of aspect 9, where the indication of the second time slot indicates a current time slot indicating network coding resumption by the second network coding device for the current time slot.

Aspect 11: The method of any of aspects 1 through 10, further including: receiving one or more messages from one or more wireless devices, the one or more messages associated with network encoding of one or more other transport blocks.

Aspect 12: The method of aspect 11, further including: refraining from performing the network encoding of the one or more other transport blocks based on receiving the one or more messages, where the one or more messages includes one or more network coded packets, or one or more feedback messages, or a combination thereof.

Aspect 13: The method of any of aspects 11 through 12, further including: transmitting, to one or more other network coding devices, a take over message indicating that the network coding device is to perform network coding for the one or more other transport blocks.

Aspect 14: The method of aspect 13, where the take over message includes: a packet identifier of the one or more other transport blocks and a source identifier of the one or more wireless devices.

Aspect 15: A method for wireless communications at a UE, including: receiving a respective broadcast message from each of a set of network coding devices, where the respective messages indicate a network coding capability for the respective network coding device of the set of network coding devices; selecting a network coding device from the set of network coding devices based on the network coding capability of the network coding device; and transmitting, to the selected network coding device, a message including both a transport block and a request to perform network encoding of the transport block for transmission to a second UE.

Aspect 16: The method of aspect 15, further including: transmitting an identifier associated with the selected network coding device in a SCI message.

Aspect 17: The method of any of aspects 15 through 16, further including: transmitting signaling requesting the selected network coding device to perform network coding for the UE for a period of time, where the signaling includes an identifier associated with the selected network coding device, a start slot time, an end slot time, or a combination thereof.

Aspect 18: The method of any of aspects 15 through 17, where the network coding capability includes: GNSS location associated with a respective network coding device, one or more parameters indicating that the respective network coding device is capable of network encoding, or a combination thereof.

Aspect 19: The method of any of aspects 15 through 18, further including: selecting the network coding device based on one or more parameters associated with the network coding device, where the one or more parameters comprise a RSRP associated with the network coding device, a signal quality associated with the network coding device, a distance of the network coding device relative to the UE, or a combination thereof.

Aspect 20: The method of aspect 19, further including: selecting the network coding device based on the network coding device with the RSRP above a threshold.

Aspect 21: The method of aspect 20, further including: receiving an indication of the threshold from a second network coding device.

Aspect 22: The method of any of aspects 15 through 21, further including: receiving an acceptance message from the network coding device in response to the message, where the acceptance message indicates that the network coding device accepts the request to perform the network encoding of the transport block.

Aspect 23: The method of any of aspects 15 through 22, further including: receiving, from a second network coding device, an indication of an overload at the second network coding device; and refraining from selecting the second network coding device from the set of network coding devices based on the indication of the overload.

Aspect 24: The method of aspect 23, where the indication of the overload includes: at least one bit indicating: a presence or absence of the overload at the second network coding device, a first time slot indicating a start time for pausing network coding at the second network coding device, a second time slot indicating resumption of network coding at the second network coding device, or a combination thereof.

Aspect 25: The method of aspect 24, where the indication of the second time slot indicates a current time slot indicating network coding resumption by the second network coding device for the current time slot.

Aspect 26: A method for wireless communications at a network coding device, including: transmitting a broadcast message indicating a network coding capability for the network coding device; receiving, from a UE, a message including a transport block, a request to perform network encoding of the transport block for transmission to a second UE, and an identifier associated with the network coding device; transmitting, to the UE, an acceptance message in response to the message, where the acceptance message indicates that the network coding device accepts the request to perform the network encoding of the transport block, and transmitting, to the second UE, the network encoded transport block.

Aspect 27: The method of aspect 26, further including: receiving, from the UE, signaling requesting the network coding device to perform network coding for the UE for a period of time, where the signaling includes an identifier associated with the network coding device, a start slot time, an end slot time, or a combination thereof.

Aspect 28: The method of any of aspects 26 through 27, further including: receiving, from a second network coding device, an indication of an overload at the second network coding device, where the acceptance message is transmitted based on the indication of the overload at the second network coding device; and transmitting, to the UE, the acceptance message based on receiving the indication of the overload at the second network coding device.

Aspect 29: The method of any of aspects 26 through 28, further including: receiving one or more messages from one or more wireless devices, the one or more messages associated with network encoding of one or more other transport blocks.

Aspect 30: The method of aspect 29, further including: refraining from performing the network encoding of the one or more other transport blocks based on receiving the one or more messages, where the one or more messages includes one or more network coded packets, or one or more feedback messages, or a combination thereof.

Aspect 31: The method of any of aspects 29 through 30, further including: transmitting, to one or more other network coding devices, a take over message indicating that the network encoding device is to perform network coding for the one or more other transport blocks.

Aspect 32: The method of aspect 31, where the take over message includes: a packet identifier of the one or more other transport blocks and a source identifier of the one or more wireless devices.

Aspect 33: An apparatus for wireless communications at a network coding device, including a processor; memory coupled with the processor; and instructions stored in the memory and executable by the processor to cause the apparatus to perform a method of any of aspects 1 through 14.

Aspect 34: An apparatus for wireless communications at a network coding device, including at least one means for performing a method of any of aspects 1 through 14.

Aspect 35: A non-transitory computer-readable medium storing code for wireless communications at a network coding device, the code including instructions executable by a processor to perform a method of any of aspects 1 through 14.

Aspect 36: An apparatus for wireless communications at a UE, including a processor; memory coupled with the processor; and instructions stored in the memory and executable by the processor to cause the apparatus to perform a method of any of aspects 15 through 25.

Aspect 37: An apparatus for wireless communications at a UE, including at least one means for performing a method of any of aspects 15 through 25.

Aspect 38: A non-transitory computer-readable medium storing code for wireless communications at a UE, the code including instructions executable by a processor to perform a method of any of aspects 15 through 25.

Aspect 39: An apparatus for wireless communications at a network coding device, including a processor; memory coupled with the processor; and instructions stored in the memory and executable by the processor to cause the apparatus to perform a method of any of aspects 26 through 32.

Aspect 40: An apparatus for wireless communications at a network coding device, including at least one means for performing a method of any of aspects 26 through 32.

Aspect 41: A non-transitory computer-readable medium storing code for wireless communications at a network coding device, the code including instructions executable by a processor to perform a method of any of aspects 26 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore. "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network coding device, comprising:
   receiving, from a user equipment (UE), a message comprising both a transport block and a request to perform network encoding of the transport block for transmission to a second UE;
   transmitting, to the UE in a transmission time interval corresponding to a backoff period for network coding requests associated with the network coding device, an acceptance message in response to the message, wherein the acceptance message indicates that the network coding device accepts the request to perform the network encoding of the transport block;
   performing the network encoding of the transport block for the transmission to the second UE after transmitting the acceptance message; and
   transmitting, to the second UE, the network encoded transport block.

2. The method of claim 1, further comprising:
   receiving, from one or more other network coding devices, one or more indications of respective backoff periods for each of the one or more other network coding devices; and
   selecting the backoff period from a set of backoff periods, wherein the backoff period is different from the respective backoff periods.

3. The method of claim 2, wherein selecting the backoff period comprises:
   randomly selecting the backoff period from the set of backoff periods.

4. The method of claim 2, further comprising:
   receiving, from a second network coding device, an indication of a maximum backoff period for the set of backoff periods.

5. The method of claim 2, wherein the set of backoff periods is based at least in part on a packet delay budget associated with the transport block.

6. The method of claim 2, wherein a maximum backoff period of the set of backoff periods is preconfigured at the network coding device.

7. The method of claim 1, further comprising:
   transmitting an indication of the backoff period to one or more other network coding devices.

8. The method of claim 1, further comprising:
   receiving, from a second network coding device, an indication of an overload at the second network coding device, wherein the acceptance message is transmitted based at least in part on the indication of the overload at the second network coding device.

9. The method of claim 8, wherein the indication of the overload comprises:
at least one bit indicating: a presence or absence of the overload at the second network coding device, a first time slot associated with a start time for pausing the network encoding at the second network coding device, a second time slot indicating resumption of the network encoding at the second network coding device, or a combination thereof.

10. The method of claim 9, wherein the indication of the second time slot indicates a current time slot indicating network coding resumption by the second network coding device for the current time slot.

11. The method of claim 1, further comprising:
receiving one or more messages from one or more wireless devices, the one or more messages associated with the network encoding of one or more other transport blocks.

12. The method of claim 11, further comprising:
refraining from performing the network encoding of the one or more other transport blocks based at least in part on receiving the one or more messages, wherein the one or more messages comprises one or more network coded packets, or
one or more feedback messages, or a combination thereof.

13. The method of claim 11, further comprising:
transmitting, to one or more other network coding devices, a take over message indicating that the network coding device is to perform network coding for the one or more other transport blocks.

14. The method of claim 13, wherein the take over message comprises:
a packet identifier of the one or more other transport blocks and a source identifier of the one or more wireless devices.

15. A network coding device, comprising:
one or more memories storing processor-executable code; and
one or more processors coupled with the one or more memories and individually or collectively operable to execute the code to cause the network coding device to:
receive, from a user equipment (UE), a message comprising both a transport block and a request to perform network encoding of the transport block for transmission to a second UE;
transmit, to the UE in a transmission time interval corresponding to a backoff period for network coding requests associated with the network coding device, an acceptance message in response to the message, wherein the acceptance message indicates that the network coding device accepts the request to perform the network encoding of the transport block;
perform the network encoding of the transport block for the transmission to the second UE after transmitting the acceptance message; and
transmit, to the second UE, the network encoded transport block.

16. The network coding device of claim 15, wherein the one or more processors are individually or collectively further operable to execute the code to cause the network coding device to:
receive, from one or more other network coding devices, one or more indications of respective backoff periods for each of the one or more other network coding devices; and
select the backoff period from a set of backoff periods, wherein the backoff period is different from the respective backoff periods.

17. The network coding device of claim 16, wherein, to select the backoff period, the one or more processors are individually or collectively operable to execute the code to cause the network coding device to:
randomly select the backoff period from the set of backoff periods.

18. The network coding device of claim 16, wherein the one or more processors are individually or collectively further operable to execute the code to cause the network coding device to:
receive, from a second network coding device, an indication of a maximum backoff period for the set of backoff periods.

19. The network coding device of claim 16, wherein the set of backoff periods is based at least in part on a packet delay budget associated with the transport block.

20. The network coding device of claim 16, wherein a maximum backoff period of the set of backoff periods is preconfigured at the network coding device.

21. The network coding device of claim 15, wherein the one or more processors are individually or collectively further operable to execute the code to cause the network coding device to:
transmit an indication of the backoff period to one or more other network coding devices.

22. The network coding device of claim 15, wherein the one or more processors are individually or collectively further operable to execute the code to cause the network coding device to:
receive, from a second network coding device, an indication of an overload at the second network coding device, wherein the acceptance message is transmitted based at least in part on the indication of the overload at the second network coding device.

23. The network coding device of claim 22, wherein the indication of the overload, comprises:
at least one bit indicate: a presence or absence of the overload at the second network coding device, a first time slot associated with a start time for pausing the network encoding at the second network coding device, a second time slot indicating resumption of the network encoding at the second network coding device, or a combination thereof.

24. The network coding device of claim 23, wherein the indication of the second time slot indicates a current time slot indicating network coding resumption by the second network coding device for the current time slot.

25. The network coding device of claim 15, wherein the one or more processors are individually or collectively further operable to execute the code to cause the network coding device to:
receive one or more messages from one or more wireless devices, the one or more messages associated with the network encoding of one or more other transport blocks.

26. The network coding device of claim 25, wherein the one or more processors are individually or collectively further operable to execute the code to cause the network coding device to:

refrain from performing the network encoding of the one or more other transport blocks based at least in part on receiving the one or more messages, wherein the one or more messages comprises one or more network coded packets, or one or more feedback messages, or a combination thereof.

27. The network coding device of claim 25, wherein the one or more processors are individually or collectively further operable to execute the code to cause the network coding device to:

transmit, to one or more other network coding devices, a take over message indicating that the network coding device is to perform network coding for the one or more other transport blocks.

28. The network coding device of claim 27, wherein, the take over message comprises:

a packet identifier of the one or more other transport blocks and a source identifier of the one or more wireless devices.

\* \* \* \* \*